US010293582B2

(12) United States Patent
Karagiannis et al.

(10) Patent No.: US 10,293,582 B2
(45) Date of Patent: *May 21, 2019

(54) CELLULOSE ESTER MULTILAYER INTERLAYERS

(71) Applicant: Solutia Inc., St. Louis, MO (US)

(72) Inventors: Aristotelis Karagiannis, Amherst, MA (US); Bruce Edward Wade, West Springfield, MA (US); Michael Eugene Donelson, Kingsport, TN (US); Khanh Duc Tran, South Hadley, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/453,486

(22) Filed: Mar. 8, 2017

(65) Prior Publication Data
US 2017/0259537 A1  Sep. 14, 2017

Related U.S. Application Data

(60) Provisional application No. 62/306,770, filed on Mar. 11, 2016.

(51) Int. Cl.
| | |
|---|---|
| *B32B 7/02* | (2019.01) |
| *B32B 27/40* | (2006.01) |
| *B32B 27/08* | (2006.01) |
| *B32B 27/42* | (2006.01) |
| *B32B 23/08* | (2006.01) |
| *B32B 17/10* | (2006.01) |
| *B32B 17/08* | (2006.01) |
| *B32B 23/20* | (2006.01) |
| *B32B 27/30* | (2006.01) |
| *B32B 23/16* | (2006.01) |
| *B32B 7/12* | (2006.01) |
| *B32B 17/00* | (2006.01) |
| *B32B 3/02* | (2006.01) |

(52) U.S. Cl.
CPC ............ *B32B 23/08* (2013.01); *B32B 3/02* (2013.01); *B32B 7/02* (2013.01); *B32B 7/12* (2013.01); *B32B 17/00* (2013.01); *B32B 17/08* (2013.01); *B32B 17/1077* (2013.01); *B32B 17/10761* (2013.01); *B32B 17/10788* (2013.01); *B32B 23/16* (2013.01); *B32B 23/20* (2013.01); *B32B 27/08* (2013.01); *B32B 27/306* (2013.01); *B32B 27/308* (2013.01); *B32B 27/40* (2013.01); *B32B 27/42* (2013.01); *B32B 2250/03* (2013.01); *B32B 2250/05* (2013.01); *B32B 2250/40* (2013.01); *B32B 2255/10* (2013.01); *B32B 2255/26* (2013.01); *B32B 2307/30* (2013.01); *B32B 2307/412* (2013.01); *B32B 2307/542* (2013.01); *B32B 2307/546* (2013.01); *B32B 2307/558* (2013.01); *B32B 2419/00* (2013.01); *B32B 2457/12* (2013.01); *B32B 2571/00* (2013.01); *B32B 2605/08* (2013.01); *B32B 2605/18* (2013.01)

(58) Field of Classification Search
None
See application file for complete search history.

(56) References Cited

U.S. PATENT DOCUMENTS

| | | |
|---|---|---|
| 1,611,139 A | 12/1926 | Bartelstone |
| 1,683,347 A | 9/1928 | Gray |
| 1,698,049 A | 1/1929 | Clarke |
| 1,802,213 A | 4/1931 | Mallabar |
| 1,809,276 A | 6/1931 | Johnston |
| 1,831,462 A | 11/1931 | Moss |
| 1,849,504 A | 3/1932 | Moss |
| 1,861,915 A | 6/1932 | Hagedorn et al. |
| 1,872,663 A | 8/1932 | Brier et al. |
| 1,880,560 A | 10/1932 | Webber |
| 1,880,808 A | 10/1932 | Clarke |
| 1,884,624 A | 10/1932 | Dreyfus |
| 1,884,809 A | 10/1932 | Moss |
| 1,923,070 A | 8/1933 | Belknap |
| 1,923,111 A | 8/1933 | Moss |
| 1,954,055 A | 4/1934 | Macht |
| 1,958,013 A | 5/1934 | Murray |
| 1,976,748 A | 10/1934 | Ryan |
| 1,976,749 A | 10/1934 | Ryan |
| 1,976,750 A | 10/1934 | Ryan |

(Continued)

FOREIGN PATENT DOCUMENTS

| | | |
|---|---|---|
| JP | 7062120 A | 3/1995 |
| JP | 2013 006725 A | 1/2013 |

(Continued)

OTHER PUBLICATIONS

Kirk-Othmer Encyclopedia of Chemical Technology, 5$^{th}$ Edition, vol. 5; 2004; pp. 394-444.

(Continued)

Primary Examiner — Sheeba Ahmed

(74) Attorney, Agent, or Firm — Steven A. Owen

(57) ABSTRACT

An interlayer structure having a cellulose ester layer for use in structural laminates is described herein. The cellulose ester layer provides rigidity and support to multilayer interlayers comprising an array of different layers. Due to the diverse properties of the cellulose ester layers, the present interlayers can be useful in producing structural laminates having high stiffness and which possess good optical clarity for a variety of applications, including outdoor structural applications.

20 Claims, 11 Drawing Sheets

(56) References Cited

U.S. PATENT DOCUMENTS

| | | |
|---|---|---|
| 1,976,758 A | 10/1934 | Watkins |
| 1,984,147 A | 12/1934 | Malm |
| 2,003,288 A | 6/1935 | Fix |
| 2,026,987 A | 1/1936 | McNally |
| 2,042,485 A | 6/1936 | Ryan |
| 2,062,541 A | 12/1936 | Wampler |
| 2,067,310 A | 1/1937 | Allden |
| 2,071,411 A | 2/1937 | Lamesch |
| 2,072,583 A | 3/1937 | Fix |
| 2,094,183 A | 9/1937 | Nobbe |
| 2,099,086 A | 11/1937 | Tinsley |
| 2,103,883 A | 12/1937 | Watkins |
| 2,115,514 A | 4/1938 | Bren |
| 2,129,052 A | 9/1938 | Fordyce |
| 2,137,377 A | 11/1938 | Bauer |
| 2,192,196 A | 3/1940 | Malm |
| 2,209,435 A | 7/1940 | Watkins |
| 2,258,991 A | 10/1941 | McNally |
| 2,281,483 A | 4/1942 | Edgar |
| 2,282,026 A | 5/1942 | Bren et al. |
| 2,282,057 A | 5/1942 | Hopkins |
| 2,336,531 A | 12/1943 | Conklin |
| 2,336,532 A | 12/1943 | Conklin |
| 2,526,728 A | 10/1950 | Burk |
| 2,558,991 A | 7/1951 | Stanton |
| 3,178,334 A | 4/1965 | Bragaw, Jr. |
| 3,582,455 A | 6/1971 | DeLap |
| 3,617,201 A | 11/1971 | Berni et al. |
| 3,620,888 A | 11/1971 | Buzzell |
| 3,762,981 A * | 10/1973 | Blank ............... B32B 17/10018 428/189 |
| 3,762,988 A | 10/1973 | Clock |
| 3,956,559 A | 5/1976 | Wildorf |
| 4,059,469 A | 11/1977 | Mattimoe et al. |
| 4,278,736 A | 7/1981 | Kamerling |
| 4,308,184 A | 12/1981 | Thoma et al. |
| 4,322,476 A | 3/1982 | Molari, Jr. |
| 4,351,681 A | 9/1982 | Kamerling |
| 4,775,558 A | 10/1988 | Haas |
| 4,952,457 A * | 8/1990 | Cartier ............... B32B 17/10018 428/425.6 |
| 5,137,954 A | 8/1992 | DasGupta et al. |
| 5,393,607 A | 2/1995 | Kawasaki et al. |
| 5,418,120 A | 5/1995 | Bauer |
| 5,565,271 A | 10/1996 | Agethen et al. |
| 5,631,328 A * | 5/1997 | Wang ........................ C08J 5/18 525/329.7 |
| 5,635,278 A | 6/1997 | Williams |
| 5,700,586 A | 12/1997 | Laiho |
| 5,725,956 A | 3/1998 | McCurdy et al. |
| 5,932,329 A | 8/1999 | Frost et al. |
| 6,001,484 A | 12/1999 | Horrion |
| 6,020,070 A | 2/2000 | Hoerner et al. |
| 6,096,425 A | 8/2000 | Smith |
| 6,365,278 B1 | 4/2002 | Hoerner et al. |
| 6,607,831 B2 | 8/2003 | Ho |
| 6,720,082 B1 | 4/2004 | Hashimoto et al. |
| 6,762,241 B1 | 7/2004 | Blum |
| 6,815,070 B1 | 11/2004 | Bürkle et al. |
| 6,825,255 B2 | 11/2004 | Yuan |
| 6,861,136 B2 | 3/2005 | Verlinden et al. |
| 6,921,509 B2 | 7/2005 | Moran |
| 6,953,623 B2 | 10/2005 | Olson et al. |
| 7,189,464 B2 | 3/2007 | Sugiura |
| 7,531,238 B2 | 5/2009 | Mizuno et al. |
| 7,641,965 B1 | 1/2010 | Bennison et al. |
| 7,883,761 B2 | 2/2011 | Bourcier et al. |
| 7,919,175 B2 | 4/2011 | Bennison et al. |
| 7,976,952 B2 | 7/2011 | Yoshida et al. |
| 8,349,986 B2 | 1/2013 | Rukavina |
| 8,399,097 B2 | 3/2013 | Bennison et al. |
| 8,399,098 B2 | 3/2013 | Bennison et al. |
| 8,399,559 B2 | 3/2013 | Rukavina |
| 8,603,616 B1 | 12/2013 | Weinhold |
| 8,729,253 B2 | 5/2014 | Buchanan et al. |
| 8,835,592 B2 | 9/2014 | Rukavina et al. |
| 8,865,287 B2 | 10/2014 | Haupt |
| 8,865,853 B2 | 10/2014 | Rukaivina |
| 8,933,166 B2 | 1/2015 | Rukavina |
| 8,986,848 B2 | 3/2015 | Nueraji et al. |
| 9,012,538 B2 | 4/2015 | Edelmann et al. |
| 9,032,692 B2 | 5/2015 | Radhakrishnan et al. |
| 9,382,355 B2 | 7/2016 | Cui et al. |
| 10,195,826 B2 | 2/2019 | Wade et al. |
| 2002/0014717 A1 | 2/2002 | Kling et al. |
| 2002/0146568 A1 | 10/2002 | Ho |
| 2004/0028907 A1 | 2/2004 | Wang |
| 2004/0175575 A1 | 9/2004 | Sugiura |
| 2007/0009714 A1 | 1/2007 | Lee et al. |
| 2008/0206572 A1 | 8/2008 | Edelmann et al. |
| 2009/0280329 A1 | 11/2009 | Rukavina et al. |
| 2009/0286061 A1 | 11/2009 | Sasada |
| 2010/0029927 A1 | 2/2010 | Buchanan et al. |
| 2010/0062236 A1 | 3/2010 | Bennison et al. |
| 2010/0124649 A1 | 5/2010 | Rukavina |
| 2010/0129665 A1 | 5/2010 | Chou |
| 2010/0167061 A1 | 7/2010 | Bennison et al. |
| 2012/0202030 A1 | 8/2012 | Kondo et al. |
| 2012/0204940 A1 | 8/2012 | Asanuma et al. |
| 2013/0095311 A1 | 4/2013 | Rukavina et al. |
| 2013/0095714 A1 | 4/2013 | Rukavina |
| 2013/0216840 A1 | 8/2013 | Radhakrishnan et al. |
| 2013/0260143 A1 | 10/2013 | Oomori et al. |
| 2013/0309448 A1 | 11/2013 | Striegler |
| 2014/0023866 A1 | 1/2014 | Rukavina et al. |
| 2014/0127500 A1 | 5/2014 | Carberry et al. |
| 2014/0199524 A1 | 7/2014 | Rukavina |
| 2014/0220286 A1 | 8/2014 | Honeycutt et al. |
| 2014/0255560 A1 | 9/2014 | Eklund |
| 2014/0357142 A1 | 12/2014 | Petty et al. |
| 2014/0364026 A1 | 12/2014 | Rukavina et al. |
| 2015/0024184 A1 | 1/2015 | Bertolini |
| 2015/0050503 A1 | 2/2015 | Hupka et al. |
| 2015/0064475 A1 | 3/2015 | Wang |
| 2015/0085217 A1 | 3/2015 | Nanjo et al. |
| 2015/0132580 A1 | 5/2015 | Boghossian |
| 2015/0140301 A1 | 5/2015 | Fisher |
| 2015/0151519 A1 | 6/2015 | Siemsen et al. |
| 2016/0159042 A1 | 6/2016 | Cui et al. |

FOREIGN PATENT DOCUMENTS

| | | |
|---|---|---|
| JP | 2013 010671 A | 1/2013 |
| WO | WO 2014 176059 A1 | 10/2014 |

OTHER PUBLICATIONS

Wade, B.; "Vinyl Acetal Polymers"; Encyclopedia of Polymer Science and Technology; 2016; 22 pages (online, copyright 2016 John Wiley & Sons, Inc.).

Co-pending U.S. Appl. No. 15/453,613, filed Mar. 8, 2017; Wade, et al.

Co-pending U.S. Appl. No. 15/453,636, filed Mar. 8, 2017; Wade, et al.

Co-pending U.S. Appl. No. 15/453,748, filed Mar. 8, 2017; Wade, et al.

Co-pending U.S. Appl. No. 15/453,466, filed Mar. 8, 2017; Karagiannis, et al.

Co-pending U.S. Appl. No. 15/453,758, filed Mar. 8, 2017; Wade, et al.

Co-pending U.S. Appl. No. 15/453,506, filed Mar. 8, 2017; Karagiannis, et al.

Co-pending U.S. Appl. No. 15/453,522, filed Mar. 8, 2017; Karagiannis, et al.

Notification of Transmittal of the International Search Report and the Written Opinion of the International Searching Authority, or the Declaration dated Mar. 10, 2017 received in International Application No. PCT/US2017/021729.

Notification of Transmittal of the International Search Report and the Written Opinion of the International Searching Authority, or the Declaration dated Jun. 15, 2017 received in International Application No. PCT/US2017/021726.

(56) References Cited

OTHER PUBLICATIONS

Non-Final Office Action received in co-pending U.S. Appl. No. 15/453,613 with notification dated Dec. 29, 2017.
Non-Final Office Action received in co-pending U.S. Appl. No. 15/453,636 with notification dated Jan. 17, 2018.
Non-Final Office Action received in co-pending U.S. Appl. No. 15/453,748 with notification dated Dec. 29, 2017.
Non-Final Office Action received in co-pending U.S. Appl. No. 15/453,466 with notification dated Nov. 13, 2017.
Non-Final Office Action received in co-pending U.S. Appl. No. 15/453,758 with notification dated Dec. 29, 2017.
Non-Final Office Action received in co-pending U.S. Appl. No. 15/453,506 with notification dated Jan. 16, 2018.
Non-Final Office Action received in co-pending U.S. Appl. No. 15/453,522 with notification dated Nov. 9, 2017.
Office Action received in co-pending U.S. Appl. No. 15/453,613 with notification dated Dec. 29, 2017.
Office Action received in co-pending U.S. Appl. No. 15/453,758 with notification dated Dec. 29, 2017.
Office Action received in co-pending U.S. Appl. No. 15/453,636 with notification dated Jan. 17, 2018.
Office Action received in co-pending U.S. Appl. No. 15/453,748 with notification dated Dec. 29, 2017.
Office Action received in co-pending U.S. Appl. No. 15/453,613 with notification dated May 10, 2018.
Office Action received in co-pending U.S. Appl. No. 15/453,522 with notification dated May 9, 2018.
Office Action received in co-pending U.S. Appl. No. 15/453,506 with notification dated May 10, 2018.
Office Action received in co-pending U.S. Appl. No. 15/453,466 with notification dated May 10, 2018.
Office Action received in co-pending U.S. Appl. No. 15/453,613 with notification date of May 10, 2018.
Office Action received in co-pending U.S. Appl. No. 15/453,636 with notification dated May 10, 2018.
Office Action received in co-pending U.S. Appl. No. 15/453,748 with notification dated May 10, 2018.
Office Action received in co-pending U.S. Appl. No. 15/453,758 with notification dated May 10, 2018.
Office Action received in co-pending U.S. Appl. No. 15/453,613 with notification dated Sep. 20, 2018.
Office Action received in co-pending U.S. Appl. No. 15/453,636 with notification dated Sep. 20, 2018.
Office Action received in co-pending U.S. Appl. No. 15/453,748 with notification dated Sep. 20, 2018.
Office Action received in co-pending U.S. Appl. No. 15/453,466 with notification dated Sep. 20, 2018.
Notice of Allowance in co-pending U.S. Appl. No. 15/453,758 with notification dated Nov. 21, 2018.
Office Action received in co-pending U.S. Appl. No. 15/453,522 with notification dated Nov. 27, 2018.
Office Action received in co-pending U.S. Appl. No. 15/453,506 with notification dated Nov. 28, 2018.

* cited by examiner

CELLULOSE ESTER MULTILAYER INTERLAYERS

CROSS REFERENCE TO RELATED APPLICATIONS

This application claims the benefit of U.S. Provisional Patent Application No. 62/306,770, filed on Mar. 11, 2016, the disclosure of which is incorporated herein by reference in its entirety.

BACKGROUND

1. Field of the Invention

The present invention generally relates to interlayers and laminates comprising a cellulose ester. More particularly, the present invention generally relates to structural interlayers and laminates comprising at least one layer that contains a cellulose ester.

2. Description of the Related Art

Generally, multiple layer glass panels comprise a laminate comprised of an interlayer or multilayer interlayer or interlayers sandwiched between two panes of glass. In some applications, a laminate may comprise only one pane of glass or other rigid substrate. The laminated multiple layer glass panels are commonly utilized in architectural window applications, in the windows of motor vehicles and airplanes, and in photovoltaic solar panels. The first two applications are commonly referred to as laminated safety glass. Typically, the main function of the interlayer in the laminated safety glass is to absorb energy resulting from impact or force applied to the glass, keep the layers of glass bonded even when the force is applied and the glass is broken, and prevent the glass from breaking up into sharp pieces. Additionally, the interlayer generally gives the glass a much higher sound insulation rating, reduces UV and/or IR light transmission, and enhances the aesthetic appeal of the associated window.

The interlayer is generally produced by mixing a polymer resin, such as poly(vinyl acetal), with one or more plasticizers and melt processing the mix into an interlayer by any applicable process or method known to one of skill in the art. After the interlayer or multilayer interlayer is formed, it is typically collected and rolled for storage and for later use in multiple layer glass panels.

Interlayers can be incorporated into multiple layer glass panels using various techniques known in the art. For example, at least one multilayer interlayer can be placed between two substrates and any excess interlayer can be trimmed from the edges, thereby creating an assembly. It is not uncommon for multiple interlayers to be placed within the two substrates thereby creating a multiple layer glass panel with multiple interlayers. Subsequently, air can be removed from the assembly by an applicable process or method known to one of skill in the art, e.g., through nip rollers, vacuum bag, vacuum ring, or another de-airing mechanism. Additionally, the interlayer can be partially press bonded to the substrates by any method known to one of ordinary skill in the art. In a last step, in order to form a final unitary structure, this preliminary bonding can be rendered more permanent by a high temperature and pressure lamination process known to one of ordinary skill in the art such as, but not limited to, autoclaving.

An emerging market in architectural laminated glass requires interlayers with structural properties such as load bearing ability. Such an interlayer is Eastman's Saflex™ DG, which is made of plasticized polyvinyl butyral ("PVB"). Generally, Saflex™ DG interlayers are stiffer products than standard PVB interlayers and this higher stiffness allows laminates made with Saflex™ DG interlayer to sustain higher loads. Alternatively, Saflex™ DG interlayers can be used to allow a reduction in the glass thickness while achieving the same laminate loading.

Consequently, higher performance interlayers are desirable as more applications requiring stiffer interlayers are emerging (e.g., single side balcony laminates, canopies, staircases, and support beams). However, many of the commercially-available PVB interlayers exhibit deficiencies in terms of processability and/or functionality. Further, the attraction of glass in many of these structural applications is the clarity of the glass panel. Thus, the PVB layers must also not hinder the optical properties of the structural glass articles in which they are incorporated.

Accordingly, there is a need for an interlayer for use in structural laminates that can provide the desired structural support and not compromise the optical properties of the laminate.

SUMMARY

One or more embodiments of the present invention concern a multilayer interlayer comprising: (a) a non-cellulose ester layer comprising an ionomer resin; and (b) a cellulose ester layer comprising at least one cellulose ester having a hydroxyl content of at least 0.5 weight percent based on the entire weight of the cellulose ester, wherein said cellulose ester layer has a glass transition ("Tg") temperature of at least 50° C.

One or more embodiments of the present invention concern a multilayer interlayer comprising: (a) a non-cellulose ester layer comprising an ionomer resin; and (b) a cellulose ester layer comprising at least one cellulose ester having a hydroxyl content of at least 0.5 weight percent based on the entire weight of the cellulose ester and a plasticizer, wherein said cellulose ester layer has a glass transition ("Tg") temperature of at least 70° C.

One or more embodiments of the present invention concern a multilayer interlayer comprising: (a) a first non-cellulose ester layer comprising an ionomer resin; and (b) a cellulose ester layer comprising at least one cellulose ester having a hydroxyl content of at least 0.5 weight percent based on the entire weight of the cellulose ester and a plasticizer, wherein said cellulose ester layer has a glass transition ("Tg") temperature of at least 50° C.; and (c) a second non-cellulose ester layer comprising an ionomer resin, wherein said cellulose ester layer is disposed between and in contact with said first non-cellulose ester layer and said second non-cellulose ester layer.

One or more embodiments of the present invention concern a laminate comprising the multilayer interlayer.

BRIEF DESCRIPTION OF THE FIGURES

Embodiments of the present invention are described herein with reference to the following drawing figures, wherein.

DETAILED DESCRIPTION

Figure 1:
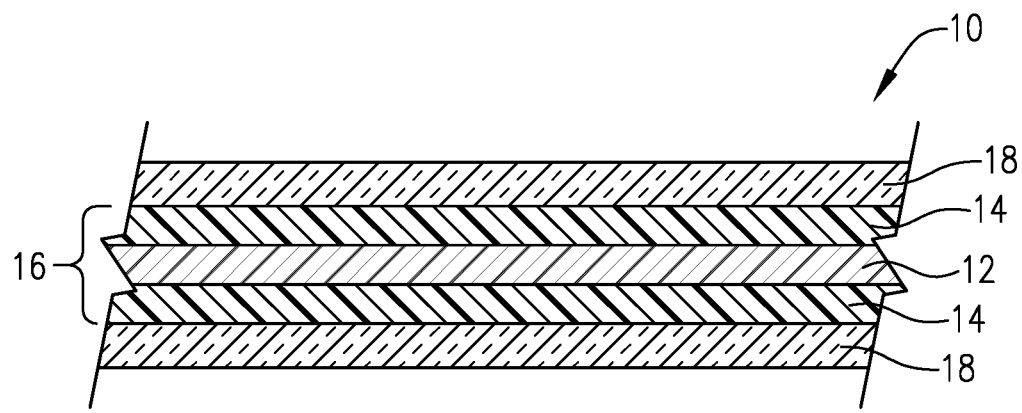
FIG. 1 depicts a structural glass laminate containing a multilayer interlayer of the present invention.

The present invention generally relates to interlayers that exhibit superior stiffness and that provide desirable optical properties when incorporated into structural laminates. More particularly, the present invention generally relates to structural interlayers comprising at least one layer containing a cellulose ester. As discussed in further detail below, the cellulose esters are able to form layers or sheets that may be incorporated in various types of interlayers comprising a vast array of different layers. The cellulose ester layers described herein can provide desirable structural support to the interlayer and structural laminate, while maintaining the desired optical properties sought in such laminates.

Generally, the present invention relates to cellulose ester layers and interlayers having improved adhesion to glass, metal, and other inorganic materials. In various embodiments, the cellulose ester layers and interlayers described herein can include at least one cellulose ester layer comprising a cellulose ester. Due to their desirable properties such as higher glass transition temperature and stiffness, the cellulose ester layers described herein can be used in structural laminates, which are finding increasing use in the present market.

As used herein, the term "cellulose ester layer" refers to one or more cellulose ester resins, optionally combined with one or more plasticizers, that have been formed into a sheet. As discussed below, these cellulose ester layers may include one or more additional additives. As used herein, the term "interlayer" refers to a single or multiple layer polymer sheet that may be suitable for use with at least one rigid substrate to form a multiple layer panel. The terms "single-sheet" and "monolithic" interlayer refer to interlayers formed of one single sheet, while the terms "multiple layer" and "multi-layer" interlayer refer to interlayers having two or more sheets that are coextruded, laminated, or otherwise coupled to one another.

The term "multilayer interlayer" refers to polymer interlayers comprising at least two polymer layers. In some embodiments, at least one layer of the multilayer interlayer can be a cellulose ester layer and at least one of those layers can be a non-cellulose ester layer (e.g., poly(vinyl acetal), thermoplastic polyurethane, ionomer and/or ethylene vinyl acetate). As discussed further below, the multiple layers may be separately extruded layers, co-extruded layers, or any combination of separately and co-extruded layers. Thus, the multilayered interlayer could comprise, for example, two or more single-layer interlayers combined together ("plural-layer interlayer"); two or more layers co-extruded together ("co-extruded interlayer"); two or more co-extruded interlayers combined together; a combination of at least one single-layer interlayer and at least one co-extruded interlayer; and a combination of at least one plural-layer interlayer and at least one co-extruded interlayer.

The various layers that can form the interlayers and structural laminates described herein are discussed in further detail below.

The Cellulose Ester Layer

Properties of the Cellulose Esters

The following description of the cellulose esters applies to all of the cellulose ester layers and the cellulose esters used in the interlayers disclosed herein.

As discussed above, the cellulose ester layers described herein can comprise one or more cellulose esters. The cellulose esters useful in the present invention can be prepared using techniques known in the art or can be commercially obtained, e.g., from Eastman Chemical Company, Kingsport, Tenn., U.S.A. Generally, the cellulose esters can be produced by any method known in the art. Examples of processes for producing cellulose esters are taught in Kirk-Othmer, Encyclopedia of Chemical Technology, 5th Edition, Vol. 5, Wiley-Interscience, New York (2004), pp. 394-444, the disclosure of which is incorporated by reference in its entirety. Cellulose, the starting material for producing cellulose esters, can be obtained in different grades and from sources such as, for example, cotton linters, softwood pulp, hardwood pulp, corn fiber and other agricultural sources, and bacterial celluloses.

One method of producing cellulose esters is by esterification. In such a method, the cellulose is mixed with the appropriate organic acids, acid anhydrides, and catalysts and then converted to a cellulose triester. Ester hydrolysis is then performed by adding a water-acid mixture to the cellulose triester, which can be filtered to remove any gel particles or fibers. Water is added to the mixture to precipitate out the cellulose ester. The cellulose ester can then be washed with water to remove reaction by-products followed by dewatering and drying.

In various embodiments, the cellulose triesters that are hydrolyzed can have three substituents selected independently from alkanoyls having from 2 to 12 carbon atoms. Examples of cellulose triesters include cellulose triacetate, cellulose tripropionate, cellulose tributyrate, or mixed triesters of cellulose such as cellulose acetate propionate and cellulose acetate butyrate. These cellulose triesters can be prepared by a number of methods known to those skilled in the art. For example, cellulose triesters can be prepared by heterogeneous acylation of cellulose in a mixture of carboxylic acid and anhydride in the presence of a catalyst such as $H_2SO_4$. Cellulose triesters can also be prepared by the homogeneous acylation of cellulose dissolved in an appropriate solvent such as LiCl/DMAc or LiCl/NMP.

Those skilled in the art will understand that the commercial term of cellulose triesters also encompasses cellulose esters that are not completely substituted with acyl groups. For example, cellulose triacetate commercially available from Eastman Chemical Company, Inc., Kingsport, Tenn., U.S.A., typically has a degree of substitution ("DS") from 2.85 to 2.95.

After esterification of the cellulose to the triester, part of the acyl substituents can be removed by hydrolysis or by alcoholysis to give a secondary cellulose ester. Secondary cellulose esters can also be prepared directly with no hydrolysis by using a limiting amount of acylating reagent. This process is particularly useful when the reaction is conducted in a solvent that will dissolve cellulose.

The cellulose ester used in the present invention generally comprises repeating units of the structure:

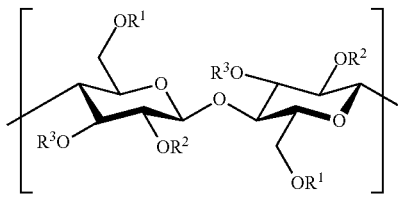

In the above structure, $R^1$, $R^2$, and $R^3$ may be selected independently from hydrogen or various acyl groups, which can include, for example, a straight chain alkanoyl having from 2 to 12 carbon atoms. In various embodiments, the cellulose esters of the present invention can include one or more acyl groups. For example, the cellulose esters can comprise acyl groups including aliphatic and/or aromatic $C_2$-$C_{12}$ substituents. For instance, the cellulose ester can be substituted with acetate, propionate, butyrate, or any aliphatic alkanoyl group having at least 2 and not more than 12 carbon atoms. In certain embodiments, the cellulose ester can be substituted with $C_2$-$C_4$ alkanoyl groups. For example, the cellulose ester can be substituted with acetate, propionate, butyrate, and combinations thereof.

In one or more embodiments, the cellulose ester can be a cellulose triester or a secondary cellulose ester. Examples of cellulose triesters include, but are not limited to, cellulose triacetate, cellulose tripropionate, or cellulose tributyrate. Examples of secondary cellulose esters include cellulose acetate, cellulose acetate propionate, and cellulose acetate butyrate. These cellulose esters are described in U.S. Pat. Nos. 1,698,049; 1,683,347; 1,880,808; 1,880,560; 1,984,147; 2,129,052; and 3,617,201, which are incorporated herein by reference in their entirety to the extent they do not contradict the statements herein.

In various embodiments, the cellulose ester can be selected from the group consisting of cellulose acetate, cellulose acetate propionate, cellulose acetate butyrate, cellulose triacetate, cellulose diacetate, cellulose tripropionate, cellulose tributyrate, and combinations thereof. In certain embodiments, the cellulose can be selected from the group consisting of cellulose acetate, cellulose acetate propionate, cellulose acetate butyrate, and combinations thereof.

In various embodiments, the cellulose ester can be a mixed cellulose ester comprising at least two different acyl groups. As used herein, a "mixed cellulose ester" refers to a cellulose ester comprising at least two different acyl substituents. Examples of mixed cellulose esters include cellulose acetate propionate and cellulose acetate butyrate. In various embodiments, the mixed cellulose ester comprises at least two different acyl groups selected from the group consisting of acetate, propionate, butyrate, benzoate, benzoate derivatives, naphthoate, naphthoate derivatives, valerate, hexanoate, stearate, and combinations thereof. In one or more embodiments, the mixed cellulose ester comprises at least two different acyl groups selected from the group consisting of acetate, propionate, butyrate, and combinations thereof. In certain embodiments, the mixed cellulose ester comprises cellulose acetate propionate.

For cellulose esters, the substitution level is usually expressed in terms of degree of substitution ("DS"), which is the average number of substituents per anhydroglucose unit ("AGU"). The above formula between brackets shows 2 AGU's. Generally, conventional cellulose contains three hydroxyl groups per AGU that can be substituted; therefore, the DS can typically have a value between 0 and 3. Generally, cellulose is a large polysaccharide with a degree of polymerization from 110 to 375 and a maximum DS of 3.0. Because DS is a statistical mean value, a value of 1 does not assure that every AGU has a single substituent. In some cases, there can be unsubstituted AGU's, some AGU's with two substituents, and some AGU's with three substituents. The DS can also refer to a particular substituent, such as, for example, a hydroxyl group, acetate, propionate, or butyrate. For instance, a cellulose acetate can have an acetate DS of 2.0 to 2.5, with the remainder being hydroxyl groups, while a cellulose acetate propionate and cellulose acetate butyrate can have a Total DS (i.e., combined DS of the two acyl substituents) of 1.7 to 2.8, with the remainder being hydroxyl groups.

In various embodiments, the cellulose esters can have a Total DS, which refers to the average number of acyl substituents per AGU, of at least 0.5, at least 0.7, at least 0.9, at least 1.0, at least 1.1, at least 1.2, at least 1.3, at least 1.4, at least 1.5, at least 1.6, at least 1.7, at least 1.8, at least 1.9, at least 2.0, at least 2.1, at least 2.2, at least 2.3, at least 2.4, at least 2.5, at least 2.6, at least 2.7, at least 2.8, at least 2.9, or at least 3. Additionally or alternatively, the cellulose esters can have a Total DS of not more than 3.0, not more than 2.95, not more than 2.9, not more than 2.8, not more than 2.7, not more than 2.6, not more than 2.5, not more than 2.4, not more than 2.3, not more than 2.2, not more than 2.1, not more than 2.0, not more than 1.9, or not more than 1.8.

In various embodiments, the cellulose esters can have a DS of at least 0.1, at least 0.2, at least 0.3, at least 0.4, at least 0.5, at least 0.6, at least 0.7, at least 0.8, at least 0.9, at least 1.0, at least 1.1, at least 1.2, at least 1.3, at least 1.4, at least 1.5, at least 1.6, at least 1.7, at least 1.8, at least 1.9, at least 2.0, at least 2.1, at least 2.2, at least 2.3, at least 2.4, at least 2.5, or at least 2.6 for at least one acyl substituent selected from the group consisting of acetate, propionate, butyrate, benzoate, benzoate derivatives, naphthoate, naphthoate derivatives, valerate, hexanoate, stearate, and combinations thereof. Additionally or alternatively, the cellulose esters can have a DS of not more than 3.0, not more than 2.9, not more than 2.8, not more than 2.7, not more than 2.6, not more than 2.5, not more than 2.0, not more than 1.8, not more than 1.6, not more than 1.5, not more than 1.4, not more than 1.3, not more than 1.2, not more than 1.1, not more than 1.0, not more than 0.9, not more than 0.8, not more than 0.7, not more than 0.6, not more than 0.5, not more than 0.4, not more than 0.3, not more than 0.2, or not more than 0.1 for at least one acyl substituent selected from the group consisting of acetate, propionate, butyrate, benzoate, benzoate derivatives, naphthoate, naphthoate derivatives, valerate, hexanoate, stearate, and combinations thereof.

In various embodiments, the cellulose esters can have an acetate DS, a propionate DS and/or a butyrate DS in the same ranges as previously described for the acyl substituent.

One way to measure the hydroxyl content of the cellulose esters used in the present invention is to measure the hydroxyl DS. The hydroxyl DS is also one way of observing the average number of hydroxyl sites per AGU that are not substituted. In various embodiments, the cellulose ester has a hydroxyl DS of at least 0.005, at least 0.05, at least 0.1, at least 0.15, at least 0.2, at least 0.25, at least 0.3, at least 0.35, or at least 0.4. Additionally or alternatively, the cellulose ester can have a hydroxyl DS of not more than 1.3, not more than 1.2, not more than 1.0, not more than 0.9, not more than 0.8, not more than 0.7, not more than 0.65, not more than 0.6, not more than 0.55, not more than 0.5, not more than 0.45, not more than 0.4, not more than 0.35, or not more than 0.3.

Although not wishing to be bound by theory, it is thought that the hydroxyl content of the cellulose ester can be adjusted to increase its wettability and solubility in alcohols. The hydroxyl content can also be adjusted to enhance compatibility of the cellulose ester layer to other layers and sheets in the interlayers, which also contain a hydroxyl content. Generally, in certain embodiments, the cellulose esters can have a hydroxyl DS in the range of 0.005 to 0.5, 0.005 to 0.45, 0.005 to 0.40, 0.005 to 0.35, 0.1 to 0.4, or 0.1 to 0.35.

It should be noted that any of the above DS ranges are also applicable to mixed cellulose esters. For example, a cellulose acetate propionate could contain any of the above-referenced acetate DS ranges and propionate DS ranges, as long as such ranges were mathematically compatible. Furthermore, in embodiments where the cellulose ester is a mixed cellulose ester, the mixed cellulose esters can comprise a higher DS for one of the acyl substituents relative to the other acyl substituent. For example, the cellulose esters can have a higher DS of acetate compared to the DS of propionate.

In certain embodiments, the mixed cellulose esters can comprise acetate and a second acyl group. In such embodiments, the mixed cellulose ester can exhibit a DS ratio of the second acyl group to the acetate of at least 0.01:1, at least 0.05:1, at least 0.1:1, at least 0.5:1, at least 1:1, at least 1.5:1, at least 2:1, at least 3:1, at least 4:1, at least 5:1, at least 10:1, at least 15:1, or at least 20:1. Additionally or alternatively, the mixed cellulose ester can exhibit a DS ratio of the second acyl group to the acetate of not more than 20:1, not more than 10:1, not more than 5:1, not more than 4:1, not more than 3:1, not more than 2:1, not more than 1:1, not more than 0.5:1, not more than 0.1:1, not more than 0.05:1, or not more than 0.01:1.

Furthermore, the cellulose esters can have a total acyl group content ("TAG"), which refers to the combination of all R acyl groups at the $R^1$, $R^2$, and $R^3$ positions shown above, measured on a weight percent basis (total weight of acyl groups divided by total weight of the cellulose ester) of at least 15, at least 20, at least 25, at least 30, at least 35, at least 37, at least 40, or at least 45 weight percent. The upper amount is not particularly limited, and can be as high as complete substitution of all hydroxyl groups, or up to 65, up to 60, or up 55 weight percent. In various embodiments, the particular TAG content of the cellulose ester can depend on the type of acyl substituents bonded to the cellulose ester backbone, as well as the properties desired.

In certain embodiments, an increase in the TAG content of the cellulose ester can render the cellulose ester more hydrophobic, increase its glass transition temperature ("Tg"), and/or improve the flexibility of the cellulose ester. Suitable ranges of TAG content on a weight percent basis can range from 15 to 60, 15 to 55, 20 to 60, 20 to 55, 25 to 60, 25 to 55, 30 to 60, 30 to 55, 35 to 60, 35 to 55, 37 to 60, 37 to 55, 40 to 60, 40 to 55, 45 to 60, or 45 to 55 weight percent. In one or more embodiments, in order to improve interfacial compatibility with a non-cellulose ester layer and/or enhance the Tg of the cellulose ester layer, the TAG content of the cellulose ester can generally range from 30 to 60, 35 to 55, 40 to 60, or 45 to 55 weight percent.

In various embodiments, the cellulose ester can comprise at least 0.1, at least 0.5, at least 1, at least 1.5, at least 5, at least 10, at least 15, at least 20, at least 25, at least 30, at least 35, at least 40, at least 45, at least 50, at least 55, or at least 60 weight percent of at least one acyl group based on the entire weight of the cellulose ester. Additionally or alternatively, the cellulose ester can comprise not more than 80, not more than 70, or not more than 65 weight percent of at least one acyl group based on the entire weight of the cellulose ester. In such embodiments, the above weight percentages may pertain to a single type of acyl substituent (e.g., acetate, propionate, benzoate, or butyrate) or to the combined weight percentage of two or more acyl substituents (e.g., acetate and propionate) in a cellulose ester.

In various embodiments, the cellulose ester, including the mixed cellulose esters, can contain acetate on a weight percentage basis (based on the combined weight of acetate groups divided by the entire cellulose ester polymer) of at least 0.1, at least 0.5, at least 1, at least 1.5, at least 5, at least 10, at least 15, at least 20, at least 25, at least 30, at least 35, at least 40, at least 45, at least 50, at least 55, or at least 60 weight percent. Additionally or alternatively, the cellulose ester can comprise not more than 80, not more than 70, not more than 65, not more than 60, not more than 57, not more than 55, not more than 52, not more than 25, not more than 20, not more than 15, not more than 10, not more than 5, not more than 4, not more than 3, not more than 2, or not more than 1.5 weight percent of acetate based on the entire weight of the cellulose ester.

In various embodiments, the cellulose ester, including the mixed cellulose esters, can contain propionate on a weight percentage basis (based on the combined weight of propionate groups divided by the entire cellulose ester polymer) of at least 0.1, at least 0.5, at least 1, at least 1.5, at least 5, at least 10, at least 15, at least 20, at least 25, at least 30, at least 35, at least 40, at least 45, at least 50, at least 55, or at least 60 weight percent. Additionally or alternatively, the cellulose ester can comprise not more than 80, not more than 70, not more than 65, not more than 60, not more than 57, not more than 55, or not more than 52 weight percent of propionate based on the entire weight of the cellulose ester.

In various embodiments, the cellulose ester, including the mixed cellulose esters, can contain butyrate on a weight percentage basis (based on the combined weight of butyrate groups divided by the entire cellulose ester polymer) in the same ranges previously described for propionate groups.

Furthermore, the hydroxyl content of the cellulose esters can be an important property to consider because it can greatly affect how the cellulose ester layer will react with plasticizers and other layers in the multilayer interlayers. In various embodiments, the cellulose ester, including the mixed cellulose esters, can contain a hydroxyl content based on weight percentage, which is calculated by dividing the combined weight of all the hydroxyl groups by the weight of the entire cellulose ester polymer, of at least 0.5, at least 1, at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, or at least 9.5 weight percent based on the total weight of the cellulose ester. Additionally or alternatively, the cellulose ester can comprise a hydroxyl weight percentage of not more than 30, not more than 25, not more than 20, not more than 19, not more than 18, not more than 17, not more than 16, not more than 15, not more than 14, not more than 13, not more than 12, not more than 11, not more than 10 weight, not more than 8, not more than 6, not more than 4, not more than 2, not more than 1, or not more than 0.5 weight percent based on the total weight of the cellulose ester.

It has been observed that cellulose esters having higher molecular weights can improve the toughness, flexibility, and impact strength of the cellulose ester layer. In various embodiments, the cellulose esters useful in the present invention can have a number average molecular weight ($M_n$) of at least 12,000, at least 15,000, at least 20,000, at least 25,000, at least 30,000, at least 35,000, at least 40,000, at least 45,000, at least 50,000, at least 55,000, at least 60,000, at least 65,000, or at least 70,000. Additionally or alternatively, the cellulose esters can have a number average molecular weight ($M_n$) of up to 120,000, up to 100,000, or up to 85,000. The Mn values are polystyrene-equivalent molecular weights determined using size exclusion chromatography.

In various embodiments, the cellulose esters can have a glass transition temperature ("Tg") of at least 40° C., at least 45° C., at least 50° C., at least 55° C., at least 60° C., at least 65° C., at least 70° C., at least 75° C., at least 80° C., at least 85° C., at least 90° C., at least 95° C., at least 100° C., at least 105° C., at least 110° C., at least 115° C., at least 120° C., at least 125° C., at least 130° C., at least 135° C., at least 140° C., or at least 145° C. Additionally or alternatively, the cellulose esters can have a Tg of not more than 250° C., not more than 240° C., not more than 230° C., not more than 220° C., not more than 210° C., not more than 200° C., not more than 190° C., not more than 180° C., not more than 170° C., not more than 165° C., or not more than 160° C. Generally, the stiffness and rigidity of the cellulose ester is more prominent at higher Tg levels. In such embodiments, the cellulose esters can have a Tg of at least 110° C., at least 120° C., or at least 130° C. The Tg of the cellulose ester is determined by differential scanning calorimetry at a 10° C./minute scan rate, second heat scan, at the mid-point of the glass transition.

In various embodiments, the cellulose ester has a melting point of at least 120° C., at least 130° C., at least 140° C., at least 150° C., at least 160° C., at least 170° C., or at least 180° C. Additionally or alternatively, the cellulose ester can have a melting point of not more than 250° C., not more than 240° C., not more than 230° C., not more than 220° C., not more than 210° C., or not more than 200° C.

In various embodiments, the cellulose esters can exhibit a melt viscosity of at least 75,000, at least 100,000, or at least 125,000 poise as measured at 170° C. and a shear rate of 1 rad/sec. Additionally or alternatively, the cellulose esters can exhibit a melt viscosity of not more than 1,000,000, not more than 900,000, or not more than 800,000 poise as measured at 170° C. and a shear rate of 1 rad/sec. In other embodiments, the cellulose esters can exhibit a melt viscosity of at least 25,000, at least 40,000, or at least 65,000 poise as measured at 170° C. and a shear rate of 10 rad/sec. Additionally or alternatively, the cellulose esters can exhibit a melt viscosity of not more than 400,000, not more than 300,000, or not more than 200,000 poise as measured at 170° C. and a shear rate of 10 rad/sec. In yet other embodiments, the cellulose esters can exhibit a melt viscosity of at least 10,000, at least 15,000, or at least 20,000 poise as measured at 170° C. and a shear rate of 100 rad/sec. Additionally or alternatively, the cellulose esters can exhibit a melt viscosity of not more than 100,000, not more than 75,000, or not more than 50,000 poise as measured at 170° C. and a shear rate of 100 rad/sec.

The degree of polymerization ("DP") as used herein refers to the number of AGU's per molecule of cellulose ester. The DP is not particularly limited, although it is desirable to employ cellulose esters having a combination of hydroxyl content and sufficiently high molecular weight to allow for film forming. In various embodiments, the cellulose esters can have a DP of at least 110, at least 120, at least 130, at least 140, at least 150, at least 160, at least 170, at least 180, at least 190, at least 200, at least 210, at least 220, at least 230, at least 240 and/or up to 350, up to 325, or up to 300.

Furthermore, the polydispersity of the cellulose ester is not particularly limited. For example, the polydispersity of the cellulose ester can range from 1 to 4, from 1 to 3.7, from 1.1 to 3.7, from 1.2 to 3.5, or from 1.2 to 3.3, although other polydispersity ranges may be applicable depending on the desired properties and application.

In various embodiments, the cellulose esters can have a falling ball viscosity of at least 0.005, at least 0.01, at least 0.05, at least 0.1, at least 0.5, at least 1, at least 1.5, at least 2, at least 4, at least 5, at least 7, at least 10, at least 12, or at least 15 and/or up to 50, up to 45, up to 40, up to 35, up to 30, or up to 25 pascals-second ("Pas") as measured by ASTM D817, Formula A.

In various embodiments, the cellulose esters desirably have not previously been subjected to fibrillation or any other fiber-producing process. In such embodiments, the cellulose esters are not in the form of fibrils and can be referred to as "non-fibril."

In various embodiments, the cellulose ester can comprise a regioselectively substituted cellulose ester. Regioselectivity substituted cellulose esters are described in U.S. Patent Application Publication No. 2010/0029927 and U.S. Pat. No. 8,729,253, the disclosures of which are incorporated herein by reference in their entireties. Generally, regioselectivity can be measured by determining the relative degree of substitution (RDS) using carbon 13 NMR. In various embodiments, the cellulose esters can comprise a regioselectively substituted cellulose ester that has an RDS ratio for one or more acyl substituents, for example, of C6>C2>C3, C6>C3>C2, C2>C3>C6, C3>C2>C6, C2>C6>C3, or C3>C6>C2, wherein C2, C3, and C6 represent the DS of the specific acyl substituent at the $R^3$, $R^2$, and $R^1$ positions, respectively, on the cellulose ester structure depicted previously.

An exemplary cellulose ester includes a cellulose ester having a total DS of from 2.5 to 3.0, a hydroxyl content of not more than 4 weight percent, a propionate or butyrate DS from 2.3 to 2.95, an acetate DS from 0.05 to 0.4, a number average molecular weight of from 30,000 to 100,000, and a Tg of at least 80° C. Another exemplary cellulose ester includes a cellulose ester having a total DS of from 2.5 to 3.0, a propionate DS from 2.5 to 2.95, an acetate DS from 0.05 to 0.4, and a number average molecular weight of from 40,000 to 80,000. Yet another exemplary cellulose ester includes a cellulose ester having a total DS of at least 2.5, a propionate or butyrate DS from 1.8 to 2.5, an acetate DS of not more than 0.35, and a hydroxyl weight percentage of 3 to 6 weight percent. Still yet another exemplary cellulose ester includes a cellulose ester having an acetate weight percentage of less than 4 weight percent, a propionate or butyrate weight percent in the range of 39 to 46 weight percent, and a hydroxyl weight percentage in the range of 3 to 6 weight percent.

Cellulose Ester Treatments and Modifications

In various embodiments, the cellulose esters and/or cellulose ester layer can be modified using one or more plasticizers. As used herein, the amount of plasticizer can be measured as parts per hundred parts resin ("phr"), on a weight per weight basis. For example, if 30 grams of plasticizer is added to 100 grams of a cellulose ester polymer, then the plasticizer content of the resulting plasticized cellulose ester would be 30 phr. As used herein, when the plasticizer content of the interlayer is given, the plasticizer content is determined with reference to the phr of the plasticizer in the corresponding cellulose ester.

In various embodiments, the cellulose ester layer comprises at least 1, at least 5, at least 10, at least 15, at least 20, at least 25, at least 30, at least 35, at least 40, at least 45, or at least 50 phr of at least one plasticizer. Additionally or alternatively, the cellulose ester layer can comprise not more than 100, not more than 75, not more than 65, not more than 60, not more than 50, not more than 40, not more than 30, not more than 20, not more than 10, not more than 5, not more than 4, not more than 3, not more than 2, or not more than 1 phr of at least one plasticizer. In one or more embodiments, the cellulose ester layer comprises in the range of 1 to 75, 5 to 65, 10 to 50, or 15 to 40 phr of at least one plasticizer. In certain embodiments, the cellulose ester layer may not contain any plasticizers.

Because of an already high polymer glass transition temperature, one of the advantages of the cellulose ester layer, one of the advantages of the cellulose ester layer is that it can tolerate high loadings of plasticizer while maintaining an acceptable stiffness/modulus, that is, an E' storage modulus that is at least higher than the E' storage modulus of at least one other (non-cellulose ester) layer in the multilayer interlayer. Thus, high amounts of plasticizer in the cellulose ester layer are tolerable because the stiffness/modulus of the cellulose ester layer will not drop below the stiffness/modulus of the other (non-cellulose ester) layers in the multilayer interlayers. Further, the cellulose ester layer can tolerate the migration of a plasticizer from the other (non-cellulose ester) layers into the cellulose ester layer while continuing to maintain a modulus that is higher than the modulus of the other (non-cellulose ester) layers in the multilayer interlayers. Unlike other thermoplastic polymers that are not as stiff or do not have a modulus that is as high, migration of plasticizer into the cellulose ester layer will not affect the properties of the cellulose ester layer to such a large extent as it might other layers, such as a poly(vinyl acetal) layer.

In various embodiments, the cellulose esters can contain at least 2, at least 5, at least 8, at least 10, at least 13, at least 15, at least 18, or at least 20 weight percent of at least one plasticizer based on the weight of the cellulose ester layer. Additionally or alternatively, the cellulose esters can contain up to 100, up to 80, up to 70, up to 60, up to 50, up to 40, up to 30, up to 25, or up 20 weight percent of at least one plasticizer based on the weight of the cellulose ester layer.

The type of plasticizer used in the cellulose ester layers is not particularly limited. The plasticizer can be any that is known in the art that can reduce the melt temperature and/or the melt viscosity of the cellulose ester. The plasticizer can be either monomeric or polymeric in structure. In various embodiments, the plasticizer can be a compound having a hydrocarbon segment of 30 or less, 25 or less, 20 or less, 15 or less, 12 or less, or 10 or less carbon atoms and at least 6 carbon atoms. Suitable conventional plasticizers for use in these interlayers include, for example, esters of a polybasic acid or a polyhydric alcohol, among others. Suitable plasticizers include, for example, triethylene glycol di-(2-ethylhexanoate) ("3GEH"), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, butyl ricinoleate, castor oil, dibutoxy ethyl phthalate, diethyl phthalate, dibutyl phthalate, trioctyl phosphate, triethyl glycol ester of coconut oil fatty acids, phenyl ethers of polyethylene oxide rosin derivatives, oil modified sebacic alkyd resins, tricresyl phosphate, and mixtures thereof. In certain embodiments, the plasticizer is 3GEH.

Additionally, other plasticizers, such as high refractive index plasticizers, may also be used, either alone or in combination with another plasticizer. As used herein, the term "high refractive index plasticizer," refers to a plasticizer having a refractive index of at least 1.460. The high refractive index plasticizers may increase or reduce the refractive index of the cellulose ester layer, which may improve the optical properties of the interlayer, including mottle, haze, and/or clarity. In embodiments, the high RI plasticizers suitable for use can have a refractive index of at least 1.460, at least 1.470, at least 1.480, at least 1.490, at least 1.500, at least 1.510, at least 1.520 and/or not more than 1.600, not more than 1.575, or not more than 1.550, measured as discussed above.

When the resin layer or interlayer includes a high RI plasticizer, the plasticizer can be present in the layer alone or it can be blended with one or more additional plasticizers. Examples of types or classes of high refractive index plasticizers can include, but are not limited to, polyadipates (RI of 1.460 to 1.485); epoxides such as epoxidized soybean oils (RI of 1.460 to 1.480); phthalates and terephthalates (RI of 1.480 to 1.540); benzoates and toluates (RI of 1.480 to 1.550); and other specialty plasticizers (RI of 1.490 to 1.520). Specific examples of suitable RI plasticizers can include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bisphenol A bis(2-ethylhexaonate), di-(butoxyethyl) terephthalate, di-(butoxyethyoxyethyl) terephthalate, and mixtures thereof. In embodiments, the high RI plasticizer may be selected from dipropylene glycol dibenzoate and tripropylene glycol dibenzoate, and/or 2,2,4-trimethyl-1,3-pentanediol dibenzoate. In various embodiments, the plasticizer can be selected from at least one of the following: benzoates, phthalates, phosphates, arylene-bis(diaryl phosphate), and isophthalates. In another embodiment, the plasticizer comprises diethylene glycol dibenzoate, abbreviated herein as "DEGDB."

Other useful plasticizers include triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate.

In various embodiments, the plasticizer can be one or more esters comprising (i) at least one acid residue including residues of phthalic acid, adipic acid, trimellitic acid, succinic acid, benzoic acid, azelaic acid, terephthalic acid, isophthalic acid, butyric acid, glutaric acid, citric acid, and/or phosphoric acid; and (ii) alcohol residues comprising one or more residues of an aliphatic, cycloaliphatic, or aromatic alcohol containing up to 20 carbon atoms.

Furthermore, in various embodiments, the plasticizer can comprise alcohol residues containing residues selected from the following: stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

In various embodiments, the plasticizer can comprise aliphatic polyesters containing $C_2$-$C_{10}$ diacid residues such as, for example, malonic acid, succinic acid, glutaric acid, adipic acid, pimelic acid, suberic acid, azelaic acid, and sebacic acids.

The plasticizer can comprise diol residues which can be residues of at least one of the following $C_2$-$C_{10}$ diols: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

The plasticizer can include polyglycols, such as, for example, polyethylene glycol, polypropylene glycol, and polybutylene glycol. These can range from low molecular weight dimers and trimers to high molecular weight oligomers and polymers.

In various embodiments, the plasticizer can comprise at least one of the following plasticizers: Resoflex® R296 plasticizer, Resoflex® 804 plasticizer, SHP (sorbitol hexapropionate), XPP (xylitol pentapropionate), XPA (xylitol pentaacetate), GPP (glucose pentaacetate), GPA (glucose pentapropionate), and APP (arabitol pentapropionate).

In various embodiments, the plasticizer can comprise from 5 to 95 weight percent of a $C_2$-$C_{12}$ carbohydrate organic ester, wherein the carbohydrate comprises from 1 to 3 monosaccharide units; and from 5 to 95 weight percent of a $C_2$-$C_{12}$ polyol ester, wherein the polyol is derived from a $C_5$ or $C_6$ carbohydrate. In one or more embodiments, the polyol ester does not comprise or contain a polyol acetate or polyol acetates. In various embodiments, the plasticizer can comprise at least one carbohydrate ester, wherein the carbohydrate portion of the carbohydrate ester is derived from one or more compounds selected from the group consisting of glucose, galactose, mannose, xylose, arabinose, lactose, fructose, sorbose, sucrose, cellobiose, cellotriose, and raffinose. In various embodiments, the plasticizer can comprise at least one carbohydrate ester, wherein the carbohydrate portion of the carbohydrate ester comprises one or more of α-glucose pentaacetate, β-glucose pentaacetate, α-glucose pentapropionate, β-glucose pentapropionate, α-glucose pentabutyrate, and β-glucose pentabutyrate. In various embodiments, the plasticizer can comprise at least one carbohydrate ester, wherein the carbohydrate portion of the carbohydrate ester comprises an α-anomer, a β-anomer, or a mixture thereof.

In various embodiments, the plasticizer can comprise a solid state plasticizer. In various embodiments, the plasticizer can comprise a plasticizer that enhances the fire retardation properties of the cellulose ester layer.

Furthermore, in various embodiments, the cellulose ester can be modified using one or more compatibilizers. For example, the cellulose ester layer can comprise at least 1, 2, 3, or 5 weight percent of the compatibilizer based on the total weight of the cellulose ester layer. Additionally or alternatively, the cellulose ester layer can comprise not more than 40, not more than 30, not more than 25, or not more than 20 weight percent of the compatibilizer based on the total weight of the cellulose ester layer. In various embodiments, the compatibilizer can be a non-reactive compatibilizer. When non-reactive compatibilizers are utilized, the compatibilizer can contain a first segment that is compatible with the cellulose ester and a second segment that is compatible with other layers in the multilayer interlayers.

In embodiments where the compatibilizer is a non-reactive compatibilizer, the first segment may contain polar functional groups, which provide compatibility with the cellulose ester, including, but not limited to, such polar functional groups as ethers, esters, amides, alcohols, amines, ketones, and acetals. The first segment may include oligomers or polymers of the following: cellulose ethers; polyoxyalkylene, such as, polyoxyethylene, polyoxypropylene, and polyoxybutylene; polyglycols, such as, polyethylene glycol, polypropylene glycol, and polybutylene glycol; polyesters, such as, polycaprolactone, polylactic acid, aliphatic polyesters, and aliphatic-aromatic copolyesters; polyacrylates and polymethacrylates; polyacetals; polyvinylpyrrolidone; polyvinyl acetate; and polyvinyl alcohol. In one or more embodiments, the first segment is polyoxyethylene or polyvinyl alcohol. The second segment can be compatible with the other layers in the multilayer interlayers and contain non-polar groups. The second segment can contain saturated and/or unsaturated hydrocarbon groups. In one or more embodiments, the second segment can be an oligomer or a polymer. In other embodiments, the second segment of the non-reactive compatibilizer is selected from the group consisting of polyolefins, polydienes, polyaromatics, and copolymers. In one or more embodiments, the first and second segments of the non-reactive compatibilizers can be in a diblock, triblock, branched, or comb structure. In such embodiments, the molecular weight of the non-reactive compatibilizers can range from 300 to 20,000, 500 to 10,000, or 1,000 to 5,000. The segment ratio of the non-reactive compatibilizers can range from 15 to 85 percent polar first segments to 15 to 85 percent nonpolar second segments.

Examples of non-reactive compatibilizers include, but are not limited to, ethoxylated alcohols, ethoxylated alkylphenols, ethoxylated fatty acids, block polymers of propylene oxide and ethylene oxide, polyglycerol esters, polysaccharide esters, and sorbitan esters. Examples of ethoxylated alcohols are $C_{11}$-$C_{15}$ secondary alcohol ethoxylates, polyoxyethylene cetyl ether, polyoxyethylene stearyl ether, and $C_{12}$-$C_{14}$ natural liner alcohol ethoxylated with ethylene oxide. $C_{11}$-$C_{15}$ secondary ethyoxylates can be obtained as Dow Tergitol® 15S (from the Dow Chemical Company). Polyoxyethylene cetyl ether and polyoxyethylene stearyl ether can be obtained under the Brij® series of products (from ICI Surfactants). $C_{12}$-$C_{14}$ natural linear alcohol ethoxylated with ethylene oxide can be obtained under the Genapol® series of products (from Hoechst Celanese). Examples of ethoxylated alkylphenols include octylphenoxy poly(ethyleneoxy)ethanol and nonylphenoxy poly(ethyleneoxy)ethanol. Octylphenoxy poly(ethyleneoxy)ethanol can be obtained as Igepal® CA series of products (from Rhodia), and nonylphenoxy poly(ethyleneoxy)ethanol can be obtained as Igepal® CO series of products (from Rhodia) or as Tergitol® NP (from Dow Chemical Company). Ethyoxylated fatty acids include polyethyleneglycol monostearate or monolaurate which can be obtained under the Nopalcol® series of products (from Henkel). Block polymers of propylene oxide and ethylene oxide can be obtained under the Pluronic® series of products (from BASF). Polyglycerol esters can be obtained under the Drewpol® series of products (from Stepan). Polysaccharide esters can be obtained under the Glucopon® series of products (from Henkel), which are alkyl polyglucosides. Sorbitan esters can be obtained under the Tween® series of products (from ICI).

In various embodiments, the compatibilizer can be a reactive compatibilizer. The reactive compatibilizer comprises a polymer or oligomer compatible with one component of the cellulose ester and functionality capable of reacting with another component of another layer of the multilayer interlayer. Generally, there are two types of reactive compatibilizers. The first reactive compatibilizer can have a hydrocarbon chain that is compatible with nonpolar segments of the other layers in the multilayer interlayers and also have functionality capable of reacting with the cellulose ester. Such functional groups include, but are not limited to, carboxylic acids, anhydrides, acid chlorides, epoxides, and isocyanates. Specific examples of this type of reactive compatibilizer include, but are not limited to: long chain fatty acids, such as stearic acid (octadecanoic acid); long chain fatty acid chlorides, such as stearoyl chloride (octadecanoyl chloride); long chain fatty acid anhydrides, such as stearic anhydride (octadecanoic anhydride); epoxidized oils and fatty esters; styrene maleic anhydride copolymers; maleic anhydride grafted polypropylene; copolymers of maleic anhydride with olefins and/or acrylic esters, such as terpolymers of ethylene, acrylic ester and maleic anhydride; and copolymers of glycidyl methacrylate with olefins and/or acrylic esters, such as terpolymers of ethylene, acrylic ester, and glycidyl methacrylate.

Examples of reactive compatibilizers include SMA® 3000 styrene maleic anhydride copolymer (from Sartomer/Cray Valley), Eastman G-3015® maleic anhydride grafted polypropylene (from Eastman Chemical Company), Epolene® E-43 maleic anhydride grafted polypropylene (from Westlake Chemical), Lotader® MAH 8200 random terpolymer of ethylene, acrylic ester, and maleic anhydride, Lotader® GMA AX 8900 random terpolymer of ethylene, acrylic ester, and glycidyl methacrylate, and Lotader® GMA AX 8840 random terpolymer of ethylene, acrylic ester, and glycidyl methacrylate (from Arkema).

In various embodiments, the cellulose ester and/or cellulose ester layer can be treated or modified with a boron atom containing compound, such as boric acid or a borate. Although not wishing not to be bound by theory, it is believed that modifying or treating the cellulose esters or cellulose ester layer with boron atom containing material, such as boric acid and/or borate, will enhance the adhesion between the cellulose ester layer and other non-cellulose ester layers in the multilayer interlayer, such as polyvinyl butyral layers. The use of boron treatments on interlayers is further described in U.S. Patent Application Publication No. 2012/0204940, which is incorporated herein by reference in its entirety.

In various embodiments, boron atom containing compounds, such as boric acid and/or borate, can be added to the cellulose ester prior to forming the cellulose ester layer. For example, boron atom containing compound can be combined with the cellulose ester to form an initial mixture, which can then be formed into the sheet forming the cellulose ester layer. In such embodiments, the boron atom containing compound can be co-extruded with the cellulose ester when forming the cellulose ester layer.

In one or more embodiments, the boric acid can comprise boric acid, metaboric acid, or mixtures thereof. In other embodiments, the borate can comprise boric anhydrides, boron oxides, triethanol amine borate (boratranes), metal borates, or a combination thereof. In certain embodiments, the borate comprises an alkali metal borate or boratrane, or borate ester such as tri-n-butyl borate or tri-n-propyl borate.

The addition of boron atom containing compounds, such as boric acid, to cellulose esters and blends thereof with different molecular weights helps to achieve a desired extrusion melt viscosity with a desired boron level or microequivalents boron/g also helps to improve adhesion. This both aides with adhesion to other polymers such as polyvinyl butyral, either in films or blends, as well as to couple the cellulose ester polymer matrix to additives, such as silica particles which are known to have residual hydroxyl content as silanols on their surfaces. For example, melt viscosity of cellulose esters, such as cellulose acetate propionate ("CAP"), and blends thereof with different molecular weights can be increased by the addition of borates, which crosslink with the hydroxyl groups in CAP, thus raising the melt viscosity. As an example, adding 0.5 phr of boric acid to a low molecular weight CAP material (CAP 482-0.5, $M_n$ 25,000 g/mol) having 20% 3GEH plasticizer increases the viscosity of the CAP to 74,176 Pa-sec (dynamic viscosity at 190° C., 0.063 rad/sec), which is about a 25-fold increase over a CAP material having a much higher initial molecular weight (CAP 482-20, $M_n$ 75,000 g/mol, dynamic viscosity of 5,013 Pa-sec at 190° C., 0.063 rad/sec) with the same 20% 3GEH plasticizer but without the addition of the boric acid. Adding 0.2 phr boric acid to the higher molecular weight CAP (CAP 482-20 with and 20% 3GEH plasticizer) increased the melt viscosity to 110,541 Pa-sec (dynamic viscosity at 190° C., 0.63 rad/sec). This high melt viscosity creates a high pressure drop that makes extrusion difficult without much higher extrusion melt temperatures, therefore the ability to increase the viscosity of the lower molecular weight CAP can be beneficial.

In various embodiments, the cellulose ester layer comprises at least 0.001, at least 0.005, at least 0.01, at least 0.05, at least 0.1, at least 0.5, at least 1, at least 2, at least 3, at least 4, at least 5, at least 6, at least 7, at least 8, at least 9, at least 10, at least 15, or at least 20 weight percent of the boron atom containing compound (such as boric acid and/or borate) based on the total weight of the cellulose ester layer. Additionally or alternatively, the cellulose ester layer can comprise not more than 75, not more than 60, not more than 50, not more than 40, not more than 30, not more than 25, not more than 20, not more than 15, not more than 10, not more than 5, or not more than 2 weight percent of the boron atom containing compound based on the total weight of the cellulose ester layer.

In some embodiments, the cellulose ester layer comprises at least 0.001, at least 0.005, at least 0.01, at least 0.05, at least 0.1, at least 0.5, at least 1, at least 2, at least 3, at least 4, at least 5, at least 6, at least 7, at least 8, at least 9, at least 10, at least 15, or at least 20 phr of the boron atom containing compound. Additionally or alternatively, the cellulose ester layer can comprise not more than 75, not more than 50, not more than 30, not more than 20, not more than 15, not more than 10, not more than 5 phr, not more than 1 phr, or not more than 0.7 phr of boron atom containing compound.

In other embodiments, the cellulose ester layer comprises at least 1, at least 5, at least 10, at least 15, or at least 20 micro equivalents of boron atom containing compound per gram of cellulose ester resin. Additionally or alternatively, the cellulose ester layer can comprise not more than 500, not more than 400, not more than 300, not more than 200, not more than 150, not more than 130, or not more than 115 micro equivalents of boron atom containing compound per gram of cellulose ester resin, where one micro equivalent is $10^{-6}$ mole boron/gram of cellulose ester resin.

Furthermore, in certain embodiments, the cellulose ester or cellulose ester layer may be modified with an antioxidant. Although not wishing not to be bound by theory, it is believed that modifying or treating the cellulose esters or cellulose ester layer with an antioxidant will enhance the adhesion between the cellulose ester layer and other layers in the multilayer interlayer, such as polyvinyl butyral layers. The antioxidant can include, for example, phenolic antioxidants such as sterically hindered alkylated bisphenol. Commercial examples of such antioxidants include, for example, Lowinox® 44B325 (from Addivant).

Furthermore, in various embodiments, the cellulose esters or the cellulose ester layers can be subjected to plasma treatment, corona treatment and/or flame treatment. Although not wishing to be bound by theory, it is believed that the plasma treatment, corona treatment and/or flame treatment will enhance the bonding between the cellulose ester layer and the other layers in a multilayer interlayer. Plasma treatment is a known technique to those skilled in the art to increase adhesion between different polymer layers.

In various embodiments, the cellulose ester layers can comprise a saponified cellulose ester. Although not wishing to be bound by theory, it is believed that the saponified cellulose ester will enhance the bonding between the cellulose ester layer and the other layers in a multilayer interlayer. Saponification with aqueous sodium hydroxide can be carried out to produce a layer of cellulose on one or both surfaces of the cellulose ester interlayer surface, and this layer can dramatically improve the interfacial adhesion between the non-cellulose ester layer (such as polyvinyl butyral and the cellulose ester). Improvement from less than 4 MPa to greater than 10 MPa in compression shear can be achieved without affecting optical properties such as yellowness or haze of the composite multilayer interlayer. Alternatively, a discrete thin film or layer of cellulose can be used as a tie layer between a non-cellulose ester layer and a cellulose ester layer. Saponification is known in the art, and can be as disclosed, for example, in Japanese Patent 07062120.

In various embodiments, the cellulose ester may be modified with a maleic anhydride. In such embodiments, cellulose ester and maleic anhydride can be combined prior to forming the cellulose ester layers. For example, the cellulose ester and maleic anhydride can be mixed and co-extruded to produce the cellulose ester layer. Additionally or alternatively, a maleic anhydride coating may be applied onto the cellulose ester layer. In such embodiments, the maleic anhydride coating may be applied to the cellulose ester layer using any method known in the art including, for example, dip coating, spray coating, gravure coating, or inkjet printing. Although not wishing to be bound by theory, it is believed that the maleic anhydride will enhance the bonding between the cellulose ester layer and the other layers in the multilayer interlayers. In various embodiments, the cellulose ester layer comprises at least 0.01, at least 0.1, at least 0.5, at least 1, at least 2, at least 3, at least 4, at least 5, at least 6, at least 7, at least 8, at least 9, at least 10, at least 15, or at least 20 and not more than 75, not more than 60, not more than 50, not more than 40, not more than 30, not more than 25, not more than 20, not more than 15, not more than 10, not more than 5, or not more than 2 weight percent of the maleic anhydride based on the total weight of the layer. In one or more embodiments, the maleic anhydride is selected from the group consisting of styrene maleic anhydride copolymers, maleic anhydride grafted polypropylene, copolymers of maleic anhydride with olefins and/or acrylic esters, and combinations thereof.

Cellulose Ester Blends

In various embodiments, the cellulose ester layers described herein can be used to form a "monolithic sheet" or a "monolithic interlayer." In certain embodiments, the monolithic interlayer or sheet can contain a polymer blend comprising a cellulose ester and at least one other thermoplastic polymer. Alternatively, these polymer blends can be used to form cellulose ester layers that are capable of better adhering to other layers in a multilayer interlayer including, for example, polyvinyl butyral layers.

As used herein, a "polymer blend" refers to the combination of at least two different species of polymers without limitation on the method for their combination. Generally, a polymer blend is in a solid state unless otherwise expressed as a molten polymer blend. Without limitation, the polymer blend can be an immiscible polymer blend in which the monolithic interlayer will exhibit two glass transition peaks. Alternatively, the polymer blend can be a miscible or homogeneous polymer blend in which the monolithic interlayer will either exhibit one glass transition peak, or appear as a compatible polymer blend on a macroscale that exhibits uniform physical properties.

In various embodiments, a polymer blend can form a polymer-polymer complex in which a molecular entity can be formed from the two polymers and such molecular entity can be ionic or uncharged. A polymer blend may or may not form an interpenetrating or semi-interpenetrating polymer network, or form a polymer composite in which at least one of the polymers forms a continuous phase while the other polymer forms a discontinuous phase.

In various embodiments, the cellulose ester layer comprises a polymer blend containing at least one cellulose ester and at least one thermoplastic polymer. The thermoplastic polymer can be selected from the group consisting of ethylene vinyl acetate, thermoplastic polyurethane, ionomer, poly(vinyl acetal), and combinations thereof.

In various embodiments, the cellulose ester layer containing the polymer blend can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of the cellulose ester based on the total weight of the layer. Additionally or alternatively, the cellulose ester layer containing the polymer blend can comprise not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, or not more than 1 weight percent of the cellulose ester based on the total weight of the layer.

In various embodiments, the cellulose ester layer containing the polymer blend can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of the thermoplastic polymer based on the total weight of the layer. Additionally or alternatively, the cellulose ester layer containing the polymer blend can comprise not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, or not more than 1 weight percent of the thermoplastic polymer based on the total weight of the layer. The particular amount of cellulose ester and the amount of thermoplastic polymer in the polymer blend and the cellulose ester layer is dependent upon the desired characteristics and types of cellulose esters and thermoplastic polymer resins chosen. In various embodiments, the cellulose ester layers described herein can comprise, consist essentially of, or consist of the polymer blend.

In one or more embodiments, the thermoplastic polymer comprises a thermoplastic polyurethane. In certain embodiments, the thermoplastic polyurethane can comprise an aliphatic polyurethane. In other embodiments, the thermoplastic polymer comprises an ethylene vinyl acetate. In certain embodiments, the ethylene vinyl acetate comprises a vinyl acetate content of at least 70, at least 80, or at least 90 and/or not more than 99, not more than 98, or not more than 95 weight percent. It has been observed that ethylene vinyl acetate polymers having higher vinyl acetate contents can be more miscible with cellulose ester when forming layers and/or blends. In other embodiments, the ethylene vinyl acetate comprises a vinyl acetate content of at least 20, at least 25, at least 30, at least 35 and/or not more than 40, not more than 35, or not more than 30 weight percent. In yet other embodiments, the thermoplastic polymer comprises an ionomer. In one or more embodiments, the ionomer resin comprises partially neutralized acid-ethylene copolymers. In other embodiments, the thermoplastic polymer comprises a poly(vinyl acetal) such as polyvinyl butyral. The various thermoplastic polymers are discussed in more detail below.

The cellulose ester can be either plasticized or unplasticized when used to produce the polymer blends. In one or more embodiments, the cellulose ester layer containing the polymer blend can comprise less than 10, less than 5, less than 4, less than 3, less than 2, or less than 1 phr of a plasticizer. In certain embodiments, the cellulose ester layer containing the polymer blend does not contain any added plasticizers. When used, the plasticizers utilized in the polymer blends can include any of the previously described plasticizers.

In various embodiments, the polymer blend can form a monolithic interlayer having a higher stiffness than an interlayer made only with the thermoplastic polymer resin. The monolithic interlayers can have good optical clarity when laminated between glass.

Furthermore, the cellulose esters can provide a dual functionality when blended with the thermoplastic polymer resins. For instance, the cellulose esters can act as a processing aid since they can melt and flow at common extrusion temperatures, thereby breaking down into smaller particles and reducing the viscosity of the thermoplastic polymer resins during processing. After being dispersed throughout the thermoplastic polymer resins, the cellulose esters can re-solidify upon cooling and can act as a reinforcing filler that strengthens the thermoplastic polymer resin.

It is believed that the cellulose esters in the polymer blends can enable the production of an interlayer that exhibits improved viscosity during processing over using solid fillers, to provide enhanced modulus and stiffness, yet simultaneously provide the necessary optical clarity required in many laminated glass or multiple layer panel applications.

The cellulose ester layers comprising the polymer blend can be produced by two different types of processes. The first process involves directly melt dispersing the cellulose ester and the thermoplastic polymer resin. The second process involves mixing a cellulose ester with a carrier thermoplastic polymer resin to produce a cellulose ester concentrate and then blending the cellulose ester concentrate with the thermoplastic to form the polymer blend.

In the first process, the cellulose ester can be blended directly with a thermoplastic polymer resin to produce a polymer blend composition that is either a molten polymer blend or a solid polymer blend. The first process generally comprises combining at least one solid thermoplastic polymer resin, at least one solid cellulose ester, and, optionally, one or more additives such as adhesion control agents ("ACAs"), compatibilizers, UV stabilizers, or any other additive mentioned above, to make a solid/solid blend, mixing the solid/solid blend, and heating the solid/solid blend for a sufficient time and at a temperature to make a molten polymer blend or a softened polymer blend.

The second process generally comprises melting a solid thermoplastic polymer resin and melting or softening a cellulose ester resin, followed by combining and mixing the molten thermoplastic polymer resin with the melted or softened cellulose ester resin for a time and a temperature sufficient to make a molten blend. As used throughout, a molten blend can have solid or softened particulates so long as at least a molten phase is present.

In the second process, the cellulose ester is first mixed with a carrier thermoplastic polymer resin to produce a cellulose ester concentrate (i.e., a cellulose ester masterbatch), which can subsequently be blended with a thermoplastic polymer resin to produce a molten or solid polymer blend. This second process may also be referred to as the "masterbatch process." One advantage of this masterbatch process is that it can more readily disperse cellulose esters having a higher Tg throughout the thermoplastic polymer resin. In one or more embodiments, the masterbatch process involves mixing a high Tg cellulose ester with a compatible carrier thermoplastic polymer resin to produce a cellulose ester concentrate, and then blending the cellulose ester concentrate with at least one thermoplastic polymer resin to produce a molten or solid polymer blend. The masterbatch has a higher concentration by weight of cellulose ester than the concentration of cellulose ester in a molten or solid polymer blend or in an interlayer or sheet.

In various embodiments, the cellulose ester concentrate can comprise at least 10, at least 15, at least 20, at least 25, at least 30, at least 35, or at least 40 weight percent of cellulose ester based on the weight of the concentrate. Additionally or alternatively, the cellulose ester concentrate can comprise not more than 90, not more than 85, not more than 80, not more than 75, not more than 70, not more than 65, not more than 60, not more than 55, or not more than 50 weight percent of cellulose ester, based on the weight of the concentrate.

The thermoplastic polymer resin, cellulose ester, fillers, and additives can be added or combined in any order during the above processes. Solid thermoplastic polymer resin particles and solid cellulose ester particles can be combined and fed together as a single stream to a melt tank and melted, optionally under mechanical agitation or shear, with the melt then fed to an extrusion device. Alternatively, the combined thermoplastic polymer resin and cellulose ester particles can be fed as a single stream into an extrusion device. In another method, the thermoplastic polymer resin and cellulose ester particles can be fed as individual streams to an extrusion device. The thermoplastic polymer resin and/or cellulose ester can be modified with a plasticizer and/or compatibilizer prior to being blended together.

A sufficient temperature for mixing the cellulose ester and the thermoplastic polymer resins can be the flow temperature of the cellulose ester, which can be at least 10° C., at least 15° C., at least 20° C., at least 25° C., at least 30° C., at least 35° C., at least 40° C., at least 45° C., or at least 50° C. above the Tg of the cellulose ester. At least a portion of the melt temperature, optionally under shear, can occur at a temperature of at least 100° C., at least 120° C., at least 140° C., at least 150° C., at least 160° C., at least 180° C., at least 200° C., at least 220° C., at least 230° C., at least 235° C., or at least 240° C. and/or up to 280° C., up to 260° C., up to 255° C., up to 250° C., up to 245° C., up to 240° C., up to 230° C., up to 220° C., or up to 210° C. The set temperature of a die through which the molten polymer blend flows is desirably at least 170° C., or at least 180° C. and/or up to 245° C., up to 240° C., up to 230° C., or up to 220° C. The temperature of the blending can be limited by the thermoplastic polymer resin's upper processing temperature range and the lower processing temperature range of the cellulose ester.

In certain embodiments, at least a portion of the blending of the cellulose ester and the thermoplastic polymer resin occurs at a temperature that will not degrade the thermoplastic polymer resin. For instance, at least a portion of the blending can occur at a temperature of not more than 250° C., not more than 200° C., not more than 180° C., not more than 170° C., not more than 160° C., or not more than 150° C.

During both of the processes described above, the cellulose esters can effectively soften and/or melt, thus allowing the cellulose esters to form into sufficiently small particle sizes under the specified blending conditions. In such embodiments, due to the small particle sizes, the cellulose esters can be thoroughly dispersed throughout the thermoplastic polymer resin during the process. In one or more embodiments, the domains of the cellulose ester in the cellulose ester layer can have a spherical or near-spherical shape. As used herein, a "near-spherical" shape is understood to include particles having a cross-sectional aspect ratio of less than 2:1. In more particular embodiments, the spherical and near-spherical domains have a cross-sectional aspect ratio of less than 1.5:1, less than 1.2:1, or less than 1.1:1. The "cross-sectional aspect ratio" as used herein refers to the ratio of the longest dimension of the particle's cross-section relative to its shortest dimension. In further embodiments, at least 75, at least 80, at least 85, at least 90, at least 95, or at least 99.9 percent of the domains of cellulose esters in the polymer blend have a cross-sectional aspect ratio of not more than 10:1, not more than 8:1, not more than 6:1, or not more than 4:1.

In various embodiments, at least 75, at least 80, at least 85, at least 90, at least 95, or at least 99.9 weight percent of the cellulose ester can have a diameter of not more than 10, not more than 8, not more than 5, not more than 4, not more than 3, not more than 2, or not more than 1 μm subsequent to melt blending the cellulose ester with the thermoplastic polymer resin.

The cellulose esters added at the beginning of the process can be in the form of a powder having particle sizes ranging from 200 to 400 μm. Subsequent to blending the cellulose ester with the thermoplastic polymer resin, the cellulose ester domain size can decrease by at least 50, at least 75, at least 90, at least 95, or at least 99 percent relative to their particle size prior to blending.

In various embodiments, the cellulose ester layer can be characterized as a disperse phase of cellulose ester in a continuous phase of the thermoplastic polymer resin. Alternatively, the cellulose ester layer can be characterized as a disperse phase of thermoplastic polymer resin in a continuous phase of the thermoplastic polymer resin.

In embodiments wherein the cellulose ester layers comprise a polymer blend having two or more Tg peaks, the Tg of the other thermoplastic polymer resin can be at least −20° C., at least 0° C., at least 10° C., at least 20° C., at least 30° C., at least 40° C., at least 45° C., at least 50° C., at least 60° C., at least 65° C., at least 70° C., at least 75° C., at least 80° C., at least 85° C., at least 90° C., at least 95° C., at least 100° C., at least 110° C., at least 120° C., at least 130° C. less than the Tg of the cellulose ester.

The melt viscosity ratio of the cellulose ester to the thermoplastic polymer resin can be at least 0.1, at least 0.2, at least 0.3, at least 0.5, at least 0.8, or at least 1.0 as measured at 170° C. and a shear rate of 400 s$^{-1}$. Additionally or alternatively, the melt viscosity ratio of the cellulose ester to the thermoplastic polymer resin can be no more than 2, no more than 1.8, no more than 1.6, no more than 1.4, or no more than 1.2 as measured at 170° C. and a shear rate of 400 s$^{-1}$. The melt viscosity ratio of the cellulose ester to the thermoplastic polymer resin can be at least 0.1, at least 0.2, at least 0.3, at least 0.5, at least 0.8, or at least 1.0 as measured at 160° C. and a shear rate of 200 s$^{-1}$. Additionally or alternatively, the melt viscosity ratio of the cellulose ester to the thermoplastic polymer resin can be no more than 2, no more than 1.8, no more than 1.6, no more than 1.4, or no more than 1.2 as measured at 160° C. and a shear rate of 200

$s^{-1}$. The mixing and blending of the aforementioned processes can be accomplished by any blending methods known in the art. Examples of mixing equipment include, but are not limited to, Banbury mixers, Brabender mixers, roll mills, planetary mixers, single screw extruders, and twin screw extruders. The shear energy during the mixing is dependent on the combination of equipment, blade design, rotation speed (rpm), and mixing time. The shear energy should be sufficient for breaking down softened/melted cellulose esters to a small enough size to disperse the cellulose esters throughout the thermoplastic polymer resin. For example, when a Banbury mixer is utilized, the shear energy and time of mixing can range from 5 to 15 minutes at 100 rpms. In certain embodiments of the present invention, at least a portion of the blending and/or mixing stages discussed above can be carried out at a shear rate of at least 50, at least 75, at least 100, at least 125, or at least 150 $s^{-1}$. Additionally or alternatively, at least a portion of the blending and/or mixing stages discussed above can be carried out at a shear rate of not more than 1,000, not more than 900, not more than 800, not more than 600, or not more than 550 $s^{-1}$.

It is known in the art that the efficiency of mixing two or more viscoelastic materials can depend on the ratio of the viscosities of the viscoelastic materials. For a given mixing equipment and shear rate range, the viscosity ratio of the dispersed phase (e.g., cellulose ester) and continuous phase (e.g., thermoplastic polymer resin) should be within specified limits for obtaining adequate particle size. In various embodiments where low shear rotational shearing equipment is utilized, such as, Banbury and Brabender mixers, the viscosity ratio of the dispersed phase (e.g., cellulose esters) to the continuous phase (e.g., thermoplastic polymer resin) can range from 0.001 to 5, from 0.01 to 5, and from 0.1 to 3. In yet another embodiment of the invention where high shear rotational/extensional shearing equipment is utilized, such as, twin screw extruders, the viscosity ratio of the dispersed phase (e.g., cellulose ester) to the continuous phase (e.g., thermoplastic polymer resin) can range from 0.001 to 500 and from 0.01 to 100.

It is also known in the art that when mixing two or more viscoelastic materials, the difference between the interfacial energy of the two viscoelastic materials can affect the efficiency of mixing. Mixing can be more efficient when the difference in the interfacial energy between the materials is minimal. In various embodiments, the surface tension difference between the dispersed phase of cellulose ester and continuous thermoplastic polymer resin phase is less than 100 dynes/cm, less than 50 dynes/cm, or less than 20 dynes/cm.

Where optical clarity is desired, a means for achieving good optical clarity is to ensure that the delta RI value (the absolute value of the difference between the refractive index of the cellulose ester and the refractive index of the thermoplastic polymer resin, inclusive of any plasticizer contained in each) between the cellulose ester and the thermoplastic polymer resin is small. Thus, the delta RI is desirably not more than 0.014, not more than 0.012, not more than 0.010, not more than 0.009, not more than 0.007, not more than 0.006, not more than 0.005, or not more than 0.004. Delta RI values of not more than 0.007 provide an excellent optical clarity. Thus, where optical clarity is needed in the desired application, the cellulose ester and the selected thermoplastic polymer resin should each have refractive indices that closely match each other (that is, having a delta RI as close to 0 as possible) as noted by the small delta RI values mentioned above. The refractive index can be measured according to ASTM D542 at a wavelength of 589 nm and 25° C. or by transferring 0.4 mL of liquid to the prism surface of an ATAGO RX-7000 (alpha) automatic digital refractometer. The sample should be bubble free for accurate results. The prism is cleaned with acetone between samples.

Properties of the Cellulose Ester Layers

In various embodiments, the cellulose ester layers described herein can comprise, consist essentially of, or consist of at least one of the previously described cellulose esters. Generally, the cellulose ester layers can comprise at least 1, at least 2, at least 3, at least 4, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of one or more cellulose esters based on the total weight of the cellulose ester layer. Additionally or alternatively, the cellulose ester layers can comprise not more than 99, not more than 95, not more than 90, not more than 80, not more than 70, not more than 60, or not more than 50 weight percent of one or more cellulose esters based on the total weight of the cellulose ester layer.

As discussed above, the cellulose ester layers described herein can provide load bearing support to a structural interlayer based on its rigidity and stiffness. For example, the cellulose ester layer can exhibit a shear storage modulus at a temperature below the Tg of the cellulose ester that is higher than the shear storage modulus of non-cellulose materials (thermoplastic materials such as poly(vinyl butyral, polyurethane, EVA, ionomer and the like). In embodiments, the shear storage modulus at a temperature below the Tg of the cellulose ester may be at least 1.00E+06, at least 1.00E+07, or at least 1.00E+08 Pa as measured according to ASTM D4065-12.

The cellulose ester layers can have varying thicknesses, which are largely determined by the type of interlayer or laminate that the layer is being used in. In various embodiments, the cellulose ester layer can have a thickness of at least 1 mil, at least 5 mils, at least 10 mils, at least 11 mils, at least 12 mils, at least 13 mils, at least 14 mils, at least 15 mils, at least 16 mils, at least 17 mils, at least 18 mils, at least 19 mils, at least 20 mils, at least 21 mils, at least 22 mils, at least 23 mils, at least 24 mils, or at least 25 mils. Additionally or alternatively, the cellulose ester layer can have a thickness of up to 2,000 mils, up to 1,000 mils, up to 500 mils, up to 100 mils, up to 80 mils, up to 50 mils, up to 45 mils, up to 40 mils, up to 35 mils, or up to 30 mils. Other thicknesses may be appropriate depending on the desired properties.

Non-Cellulose Ester Layers

As noted above, the cellulose ester layers described herein can be used with various types of non-cellulose ester layers to form multilayer interlayers and structural laminates. As used herein, a "non-cellulose ester layer" refers to a separate layer or sheet that does not contain a cellulose ester. In various embodiments, these non-cellulose ester layers can be formed from a thermoplastic resin selected from the group consisting of ethylene vinyl acetate, thermoplastic polyurethane, ionomer, poly(vinyl acetal), and mixtures thereof. The various configurations and types of non-cellulose ester layers are described in detail below.

The use of a non-cellulose ester layer(s) in combination with a cellulose ester(s) can provide beneficial properties to a multilayer interlayer. For example, multiple layer interlayers comprising multiple poly(vinyl acetal) resins and layers having different properties and plasticizer levels sometimes experience plasticizer partitioning between the layers as the interlayer equilibrates. When a cellulose ester layer(s) is used, depending on the combination of layers and structure, even if plasticizer partitions or moves to the cellulose ester layer, the modulus of the cellulose ester layer remains higher than that of the other, non-cellulose ester layer because the cellulose ester layer retains higher glass transition temperature even after plasticizer moves to it.

Generally, the non-cellulose ester layers can comprise at least 1, at least 2, at least 3, at least 4, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of one or more thermoplastic resins based on the total weight of the non-cellulose ester layer. Additionally or alternatively, the non-cellulose ester layers can comprise not more than 99, not more than 95, not more than 90, not more than 80, not more than 70, not more than 60, or not more than 50 weight percent of one or more thermoplastic resins based on the total weight of the non-cellulose ester layer. The types of non-cellulose ester layers and thermoplastic resins that can be used to produce such layers are described further below.

In various embodiments, the non-cellulose ester and cellulose ester layers can be in direct contact with each other or can be indirectly disposed adjacent to each other through another layer. In one or more embodiments, at least one non-cellulose ester layer and at least one cellulose ester layer are in direct contact with each other when forming an interlayer or laminate. In such embodiments, the non-cellulose ester layers and cellulose ester layers are desirably directly bonded to each other, although adhesive agents may be utilized to enhance this bond. Generally, this bond can be a heat bond which forms when the layers are laid up against each other and the multilayer interlayer is heated to above the Tg of all layers. This can occur, for example, by laying up the layers against each other and heat pressing or by co-extruding the layers, or a combination of both.

In various embodiments, the multilayered interlayers described herein comprise at least two polymer layers (e.g., a single layer or multiple layers co-extruded) disposed in direct or indirect contact with each other, desirably in direct contact with each other, wherein the interlayers comprise at least one cellulose ester layer and at least one non-cellulose ester layer.

When three or more layers are employed in the multilayered interlayers, some of the layers can be referred to as skin layers and one or more may be referred to as core layers. As used herein, "skin layer" generally refers to outer layers of the interlayer and "one or more core layers" generally refers to one or more of the inner layer(s) disposed between the skin layers. At least one side of a core layer can be in direct contact with at least one side of a skin layer or may be in indirect contact with a skin layer through a tie layer, a coating or adhesive agent.

Exemplary multilayer interlayer embodiments include: non-cellulose ester/cellulose ester/non-cellulose ester (e.g., a skin layer/core layer/skin layer), non-cellulose ester/cellulose ester (e.g., skin/core), non-cellulose ester/cellulose ester/non-cellulose ester/non-cellulose ester (e.g., skin/core/core/skin), or non-cellulose ester/non-cellulose ester/cellulose ester/non-cellulose ester/non-cellulose ester (e.g., skin/core/core/core/skin). Other embodiments are possible, as would be known to one skilled in the art.

FIG. 1 depicts an exemplary structural laminate 10 comprising a cellulose ester layer 12 and two non-cellulose ester layers 14, which form the multilayer interlayer 16. As shown in FIG. 1, the interlayer 16 is interposed between two rigid substrates 18, such as glass.

The multilayer interlayers described herein can also have more than three layers (e.g., at least 4, at least 5, at least 6, or up to 10 or more individual layers), so long as at least one of the layers is a non-cellulose ester layer and one layer is a cellulose ester layer. In various embodiments, the multilayer interlayers can contain 2, 3, 4, or more of the non-cellulose ester layers and 2 or more of them can be in direct contact with each other, with a cellulose ester layer, or with other types of layers. The multilayer interlayer can contain 2, 3, 4, or more cellulose ester layers, and they can be in direct contact with each other, with the non-cellulose ester layer(s), or with other types of layers. Desirably, in the multilayer interlayer structures having at least 3 layers, at least one cellulose ester layer is disposed between two non-cellulose ester layers to provide the rigidity and stiffness to an interlayer. The non-cellulose ester layers can have varying thicknesses, which are largely determined by the type of interlayer or laminate that the layer is being used in, and can be any of the thicknesses previously discussed for the cellulose layer.

The non-cellulose ester layers described herein can further include at least one plasticizer. Depending on the specific composition of the thermoplastic resin forming the non-cellulose layers, the plasticizer may be present in an amount of at least 1, at least 2, at least 3, at least 4, at least 5, at least 10, at least 15, at least 20, at least 25, at least 30, at least 35, at least 40, at least 45, at least 50, at least 55, at least 60 phr and/or not more than 120, not more than 110, not more than 105, not more than 100, not more than 95, not more than 90, not more than 85, not more than 75, not more than 70, not more than 65, not more than 60, not more than 55, not more than 50, not more than 45, or not more than 40 phr, although other amounts may be used depending on the materials and desired properties. In some embodiments, there may be no added plasticizer.

For layers of unknown plasticizer content, the plasticizer content can be determined via a wet chemical method in which an appropriate solvent, or mixture of solvents, is used to extract the plasticizer from the polymer layer or interlayer. Prior to extracting the plasticizer, the weight of the sample layer is measured and compared with the weight of the layer from which the plasticizer has been removed after extraction. Based on this difference, the weight of plasticizer can be determined and the plasticizer content, in phr, calculated. For multiple layer interlayers, the polymer layers can be physically separated from one another and individually analyzed according to the above procedure.

Notably, for a given type of plasticizer, the compatibility of the plasticizer in the non-cellulose ester layer is largely determined by the hydroxyl content of the thermoplastic resin forming the layer, especially when, for example, the thermoplastic resin comprises poly(vinyl acetal). Thermoplastic resins with greater residual hydroxyl content are typically correlated with reduced plasticizer compatibility or capacity, typically due to the hydrophobicity of the plasticizer being more compatible with fewer hydrophilic groups present on the polymer chain. Conversely, polymers with a lower residual hydroxyl content typically will result in increased plasticizer compatibility or capacity. Generally, this correlation between the residual hydroxyl content of a polymer and plasticizer compatibility/capacity can be manipulated and exploited to allow for addition of the proper amount of plasticizer to the polymer resin and to stably maintain differences in plasticizer content between multiple interlayers. Examples of suitable plasticizers that may be used to produce the non-cellulose ester layers can include any of the above-described plasticizers that are used to produce the cellulose ester layers.

In various embodiments, the cellulose ester layers and non-cellulose ester layers can exhibit different glass transition temperatures. The difference in the glass transition temperature of the cellulose ester layer and the glass transition temperature of the non-cellulose ester layers can be at least 3° C., at least 5° C., at least 8° C., at least 10° C., at least 12° C., at least 15° C., at least 18° C., at least 20° C., at least 22° C., or at least 25° C. or more.

The glass transition temperatures of the non-cellulose ester layers described herein were determined by dynamic mechanical thermal analysis (DMTA) according to the following procedure. A polymer sheet is molded into a sample disc of 25 millimeters (mm) in diameter. The polymer sample disc is placed between two 25-mm diameter parallel plate test fixtures of a Rheometrics Dynamic Spectrometer II. The polymer sample disc is tested in shear mode at an oscillation frequency of 1 Hertz as the temperature of the sample is increased from −20 to 70° C. at a rate of 2° C./minute. The position of the maximum value of tan delta (damping) plotted as dependent on temperature is used to determine the glass transition temperature. Experience indicates that the method is reproducible to within +/−1° C.

The types of thermoplastic resins that can be used to form the non-cellulose ester layers are now described in further detail below.

EVA Layers

In various embodiments, the non-cellulose ester layer described herein can comprise, consist essentially of, or consist of an ethylene vinyl acetate ("EVA") resin. In such embodiments, the non-cellulose ester layer may also be referred to as an "EVA layer." These materials are commercially available, for example, as EVALAYER EV070C clear EVA film (from Interlayer Solutions), and as VISTASOLAR® 520.68 film (from TPI All Seasons Co., LTD), as well as from other suppliers.

In embodiments where the non-cellulose ester layer comprises EVA, the layer can contain minute amounts of plasticizer. For example, the EVA layer may comprise less than 20, less than 15, less than 10, less than 5, less than 2, or less than 1 phr of plasticizer when the layer comprises EVA. In certain embodiments, the EVA layer does not contain any plasticizers when the layer comprises EVA.

EVA having different levels of vinyl acetate co-monomer can be used, depending on the desired properties. In certain embodiments, the EVA comprises a vinyl acetate content of at least 70, at least 80, or at least 90 and/or not more than 99, not more than 98, or not more than 95 weight percent. In this range, the EVA may be miscible in the cellulose ester. In other embodiments, the vinyl acetate content may be less than 70 weight percent, such as at least about 10, or at least about 15, or at least about 20, or at least about 25 or more and/or not more than about 45, not more than about 40, not more than about 35 weight percent, or from about 20 to about 40 or about 25 to about 35 weight percent, although different amounts may be used depending on the desired application and properties.

In various embodiments, the EVA comprises a formulated EVA, which in embodiments, contains a silane additive, a peroxide additive, a co-activator, a UV blocker, and an antioxidant. Alternatively, the EVA can comprise an "unformulated" EVA, which is missing one of the above listed components contained in the formulated EVA, such as a peroxide additive (in which case the EVA would no longer be thermally reactive). In various embodiments, the EVA can be maleated.

The EVA layers can be used in conjunction with the cellulose ester layers described herein to produce various types of multilayer interlayers, which can include other types of layers including poly(vinyl acetal) layers, such as polyvinyl butyral ("PVB") layers. Exemplary multilayer interlayer configurations include: EVA/cellulose ester/EVA (e.g., skin/core/skin); EVA/cellulose ester polymer blend/EVA (e.g., skin/core/skin); and PVB/EVA/cellulose ester/EVA/PVB (e.g., skin/core/core/core/skin).

Although not wishing to be bound by theory, it is believed that the EVA layers can also function as tie layers between poly(vinyl acetal) layers and the cellulose esters and can enhance the bond between these two layers. In such embodiments, the EVA layers can be at least partially interposed between the poly(vinyl acetal) and the cellulose ester layers. In other embodiments, the EVA can be a separate layer that is not a tie layer.

Multilayer interlayers containing an EVA layer and a cellulose ester layer can be produced using any method known in the art. For example, each layer may be formed separately using techniques known in the art and then laminated together. Alternatively, multilayer interlayers containing an EVA layer and a cellulose ester layer may be produced via co-extrusion.

Due to the crosslinking properties of EVA, it is generally desirable to avoid fully crosslinking the EVA when forming the EVA layer. Typically, partially crosslinked EVA is still able to be co-extruded with cellulose esters to form the multilayer interlayers. Thus, it can be desirable to utilize extrusion temperatures that do not fully crosslink the EVA.

Thermoplastic Polyurethane Layers

In various embodiments, the non-cellulose ester layer described herein can comprise, consist essentially of, or consist of a thermoplastic polyurethane ("TPU") resin. In such embodiments, the non-cellulose ester layer may also be referred to as a "TPU layer." One example is Product A4700NAT (commercially available from Deerfield Urethane). In various embodiments, the TPU can comprise an aliphatic isocyanate-polyether or polyester urethane. Additionally, in certain embodiments, the TPU may also comprise a UV stabilizer and an antioxidant in order to provide additional stability to the TPU when it is exposed to heat and UV light.

In embodiments where the non-cellulose ester layer comprises a TPU, the layer can contain minute amounts of plasticizer. For example, the TPU layer may comprise less than 10, less than 5, less than 2, or less than 1 phr of plasticizer. In certain embodiments, the TPU layer does not contain any plasticizers.

The TPU layers can be used in conjunction with the cellulose ester layers described herein to produce various types of multilayer interlayers, which may also include poly(vinyl acetal) or PVB layers. Exemplary multilayer interlayer configurations include: TPU/cellulose ester/TPU (e.g., skin/core/skin); TPU/cellulose ester polymer blend/TPU (e.g., skin/core/skin); and PVB/TPU/cellulose ester/TPU/PVB (e.g., skin/core/core/core/skin).

Although not wishing to be bound by theory, it is believed that the TPU layers can function as tie layers between poly(vinyl acetal) layers and the cellulose esters and can enhance the bond between these two layers. In such embodiments, the TPU layers can be at least partially interposed between the poly(vinyl acetal) and the cellulose ester layers. In other embodiments, the TPU can be a separate layer that is not a tie layer.

Multilayer interlayers containing a TPU layer and a cellulose ester layer can be produced using any method known in the art. For example, each layer may be formed separately using techniques known in the art and then laminated together. Alternatively, multilayer interlayers containing a TPU layer and a cellulose ester layer may be produced via co-extrusion.

Ionomer Layers

In various embodiments, the non-cellulose ester layer described herein can comprise, consist essentially of, or consist of an ionomer resin. In such embodiments, the non-cellulose ester layer may also be referred to as an "ionomer layer."

Generally, the ionomer resin can comprise partially neutralized acid-ethylene copolymers. Furthermore, the ionomer resin can have an acid functionality in the range of from 0.1 to 30 weight percent, from 1 to 25 weight percent, or from 5 to 20 weight percent, based on the total weight of the polymer. In one or more embodiments, the ionomer resin can have at least 0.1, at least 1, at least 5, at least 10, at least 15 weight percent and/or not more than 30, not more than 25, or not more than 20 weight percent acid functionality from one or more acrylic acids. Such acrylic acids can include, for example, acrylic acid, maleic acid, maleic anhydride, methacrylic acid, itaconic acid, fumaric acid, monomethyl maleic acid, and mixtures thereof.

Furthermore, in various embodiments, the ethylene copolymer can be selected from the group consisting of acrylates, methacrylates, and combinations thereof. In such embodiments, the methacrylates can comprise methyl acrylate, methyl methacrylate, butyl acrylate, butyl methacrylate, glycidyl methacrylate, vinyl acetate, and mixtures thereof. Ionomer resins are further described in U.S. Pat. Nos. 8,399,097 and 8,399,098, the disclosures of which are incorporated herein by reference in their entireties.

In embodiments where the non-cellulose ester layer comprises an ionomer, the layer can contain minute amounts of plasticizer. For example, the ionomer layer may comprise less than 10, less than 5, less than 2, or less than 1 phr of plasticizer. In certain embodiments, the ionomer layer does not contain any plasticizers.

The ionomer layers can be used in conjunction with the cellulose ester layers described herein to produce various types of multilayer interlayers, which may also include poly(vinyl acetal) layers. Exemplary multilayer interlayer configurations include: ionomer/cellulose ester/ionomer (e.g., skin/core/skin); ionomer/cellulose ester polymer blend/ionomer (e.g., skin/core/skin); and PVB/ionomer/cellulose ester/ionomer/PVB (e.g., skin/core/core/core/skin).

Multilayer interlayers containing an ionomer layer and a cellulose ester layer can be produced using any method known in the art. For example, each layer may be formed separately using techniques known in the art and then laminated together. Alternatively, multilayer interlayers containing an ionomer layer and a cellulose ester layer may be produced via co-extrusion.

Poly(Vinyl Acetal) Layers

In various embodiments, the non-cellulose ester layer described herein can comprise, consist essentially of, or consist of a poly(vinyl acetal) resin, such as polyvinyl butyral. The poly(vinyl acetal) layers can be used in conjunction with the cellulose ester layers described herein to produce various types of multilayer interlayers. Exemplary multilayer interlayer configurations include: PVB/adhesive coating/cellulose ester polymer/adhesive coating/PVB (e.g., skin/core/skin) and PVB/cellulose ester polymer blend/PVB (e.g., skin/core/skin).

The poly(vinyl acetal) resin can be produced formed by acetalization of poly(vinyl alcohol) with one or more aldehydes in the presence of a catalyst according to known methods such as, for example, those described in U.S. Pat. Nos. 2,282,057 and 2,282,026, as well as Wade, B. 2016, Vinyl Acetal Polymers, Encyclopedia of Polymer Science and Technology. 1-22 (online, copyright 2016 John Wiley & Sons, Inc.), the entire disclosures of which are incorporated herein by reference in their entireties.

Poly(vinyl acetal) resins typically have a residual hydroxyl content, an ester content, and an acetal content. As used herein, residual hydroxyl content (calculated as PVOH) refers to the weight percent of moieties having a hydroxyl group remaining on the polymer chains. For example, poly (vinyl acetal) can be manufactured by hydrolyzing poly (vinyl acetate) to PVOH, and then reacting the PVOH with an aldehyde, such as butyraldehyde, propionaldehyde, and the like, and desirably butyraldehyde, to make a polymer having repeating vinyl butyral units. In the process of hydrolyzing the poly(vinyl acetate), typically not all of the acetate side groups are converted to hydroxyl groups. For example, reaction with butyraldehyde typically will not result in the conversion of all hydroxyl groups on the PVOH to acetal groups. Consequently, in any finished polyvinyl butyral, there typically will be residual ester groups such as acetate groups (as vinyl acetate groups) and residual hydroxyl groups (as vinyl hydroxyl groups) as side groups on the polymer chain and acetal (e.g., butyral) groups (as vinyl acetal groups). As used herein, residual hydroxyl content is measured on a weight percent basis per ASTM 1396.

In various embodiments, the poly(vinyl acetal) resin comprises a polyvinyl butyral resin, which is also interchangeably referenced herein as "PVB." An example of a polyvinyl butyral structure is used to further illustrate how the weight percentages are based from the moiety unit to which is bonded the relevant pendant group:

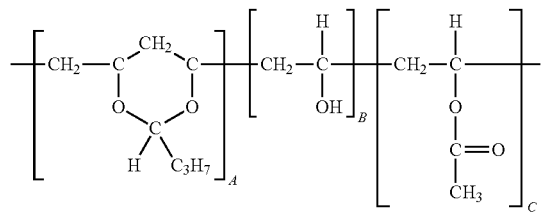

Taking the above structure of polyvinyl butyral, the butyral or acetal content is based on the weight percentage of unit A in the polymer, the OH content is based on the weight percentage of unit B in the polymer (a polyvinyl OH moiety or PVOH), and the acetate or ester content is based on the weight percentage of unit C in the polymer.

The hydroxyl group content of the poly(vinyl acetal) resin is not particularly limited, but suitable amounts are from at least 6, at least 8, at least 10, at least 11, at least 12, at least 13, at least 14, at least 15, at least 16, or at least 17 and in each case up to 35 weight percent or more of PVOH. In general, a poly(vinyl acetal) resin having a lower hydroxyl weight percentage has the capability of absorbing more plasticizer and absorbing it more efficiently.

Where optical clarity is desired, however, the hydroxyl weight percentage can have an influence on the refractive index of the poly(vinyl acetal) resin. Therefore, depending on the type of cellulose ester selected, the hydroxyl weight percentage of the poly(vinyl acetal) can be adjusted along with the amount of plasticizer to achieve the desired refractive index where optical clarity is desirable.

The poly(vinyl acetal) resin can also comprise 20 weight percent or less, 17 weight percent or less, 15 weight percent or less, 13 weight percent or less, 11 weight percent or less, 9 weight percent or less, 7 weight percent or less, 5 weight percent or less, or 4 weight percent or less of residual ester groups calculated as polyvinyl ester, e.g., acetate, with the balance being an acetal, e.g., butyraldehyde acetal, but optionally including other acetal groups in a minor amount, for example, a 2-ethyl hexanal group (see U.S. Pat. No. 5,137,954, the entire disclosure of which is incorporated herein by reference). As with the residual hydroxyl group measurement, the weight percent of residual ester groups (e.g., residual acetate content) is based on the moiety in the polymer backbone onto which is linked the acetate group, including the pendant acetate group.

The poly(vinyl acetal) resin used in the invention can also have an acetal content of at least 50, at least 55, at least 60, at least 65, at least 70, at least 75, at least 80, at least 85, or at least 90 weight percent. Additionally or alternatively, the acetal content can be up to 94, up to 93, up to 92, up to 91, up to 90, up to 89, up to 88, up to 86, up to 85, up to 84, up to 83, up to 82, up to 80, up to 78, up to 77, up to 75, up to 70, or up to 65 weight percent.

The acetal groups in the poly(vinyl acetal) resins can comprise vinyl propynal groups or vinyl butyral groups. In one or more embodiments, the acetal groups comprise vinyl butyral groups. In some embodiments, the poly(vinyl acetal) resin can include residues of any aldehyde and, in some embodiments, may include residues of at least one $C_4$ to $C_8$ aldehyde. Examples of suitable $C_4$ to $C_8$ aldehydes can include, for example, n-butyraldehyde, i-butyraldehyde, 2-methylvaleraldehyde, n-hexyl aldehyde, 2-ethylhexyl aldehyde, n-octyl aldehyde, and combinations thereof. One or more of the poly(vinyl acetal) resins utilized in the layers and interlayers described herein can include at least 20, at least 30, at least 40, at least 50, at least 60, or at least 70 weight percent of residues of at least one $C_4$ to $C_8$ aldehyde, based on the total weight of aldehyde residues of the resin. Alternatively, or in addition, the poly(vinyl acetal) resin may include not more than 99, not more than 90, not more than 85, not more than 80, not more than 75, not more than 70, or not more than 65 weight percent of at least one $C_4$ to $C_8$ aldehyde. The $C_4$ to $C_8$ aldehyde may be selected from the group listed above, or it can be selected from the group consisting of n-butyraldehyde, i-butyraldehyde, 2-ethylhexyl aldehyde, and combinations thereof.

The weight average molecular weight of the poly(vinyl acetal) resin is not particularly limited. The poly(vinyl acetal) resin can have a weight average molecular weight ($M_w$) of at least 20,000, at least 30,000, at least 40,000, at least 50,000, at least 60,000, or at least 70,000, with no particular upper limit, although practically up to 300,000 Daltons is suitable, although higher molecular weights maybe be used in some cases, and in each case as measured by size exclusion chromatography using the low angle laser light scattering (SEC/LALLS) method of Cotts and Ouano in tetra-hydrofuran as described below.

Multilayer interlayers containing a poly(vinyl acetal) layer and a cellulose ester layer can be produced using any method known in the art. For example, each layer may be formed separately using techniques known in the art and then laminated together. Alternatively, multilayer interlayers containing a poly(vinyl acetal) layer and a cellulose ester layer may be produced via co-extrusion.

The poly(vinyl acetal) layers can comprise a plasticizer in the amounts disclosed above in regard to the non-cellulose ester. Furthermore, the plasticizers used in the poly(vinyl acetal) layers can include any of those discussed above in reference to the cellulose ester layer and the non-cellulose ester layer.

Although not wishing to be bound by theory, it is assumed that the compatibility of a given plasticizer with a poly(vinyl acetal) resin can depend, at least in part, on the composition of the polymer, and, in particular, on its residual hydroxyl content. Overall, poly(vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer resin layer that exhibits a lower glass transition temperature than a similar resin having a higher residual hydroxyl content. Depending on the specific resin and plasticizer, these trends could be reversed.

In various embodiments, a non-cellulose ester layer comprising at least one poly(vinyl acetal) resin can contribute to a higher glass/interlayer adhesion and/or a better ability to absorb impact energy. In one or more embodiments, the Tg of the non-cellulose ester layer comprising at least one poly(vinyl acetal) resin is not greater than 50° C., not greater than 49° C., not greater than 48° C., not greater than 47° C., not greater than 46° C., not greater than 45° C., not greater than 44° C., not greater than 43° C., not greater than 42° C., not greater than 41° C., not greater than 40° C., not greater than 39° C., not greater than 38° C., not greater than 37° C., not greater than 36° C., not greater than 37° C., not greater than 36° C., not greater than 35° C., not greater than 34° C., not greater than 33° C., not greater than 32° C., not greater than 31° C., or not greater than 30° C. and in each case at least −20° C., at least 0° C., or at least 25° C.

Additionally or alternatively, the Tg of a non-cellulose ester layer comprising a poly(vinyl acetal) resin can be at least 10° C., at least 20° C., at least 30° C., at least 40° C., at least 45° C., at least 50° C., at least 60° C., at least 65° C., at least 70° C., at least 75° C., at least 80° C., at least 85° C., at least 90° C., at least 95° C., at least 100° C., at least 110° C., at least 120° C., or at least 130° C. less than the Tg of at least one of the cellulose ester layers. The glass transition temperature is measured using DMTA as described above.

In various embodiments, the poly(vinyl acetal) layers can be used in conjunction with the cellulose ester layers to produce acoustic interlayers. Often, polymers that exhibit one set of desirable properties, such as acoustic performance, lack other desirable properties, such as impact resistance or strength. Therefore, in order to achieve desirable combinations of properties, multilayered interlayers can be produced containing a poly(vinyl acetal) layer exhibiting desirable acoustic performance and a cellulose ester layer providing impact strength and resistance. These multilayered interlayers may include at least one inner cellulose ester layer sandwiched between two outer poly(vinyl acetal) layers. Alternatively, these multilayered interlayers may contain one or more poly(vinyl acetal) layers exhibiting desirable acoustical properties placed on at least one cellulose ester layer. In such embodiments, the poly(vinyl acetal) layers will generally be softer and exhibit a lower glass transition temperature compared to the cellulose ester layer, which enhances its acoustic performance. In one or more embodiments, the acoustic interlayers can contain a poly (vinyl acetal) layer having a Tg of at least −30, at least −25, at least −20, at least −15, at least −10, at least −5, or at least 0° C. and/or less than 40, less than 30, less than 25, less than 20, less than 15, less than 10, or less than 5° C.

Furthermore, in various embodiments, this poly(vinyl acetal) resin or poly(vinyl acetal) layer may exhibit enhanced acoustic properties, such as, for example, an improved tan delta as compared to a comparable poly(vinyl n-butyral) resin layer. Tan delta is the ratio of the loss modulus (G") in Pascals to the storage modulus (G') in Pascals of a specimen measured by Dynamic Mechanical Thermal Analysis (DMTA). The DMTA is performed with an oscillation frequency of 1 Hz under shear mode and a temperature sweep rate of 3° C./min. The peak value of the G"/G' curve at the glass transition temperature is the tan delta value. Higher tan delta values are indicative of higher damping, which can translate to better sound dampening, or acoustic, performance.

Moreover, in various embodiments, the poly(vinyl acetal) resin or poly(vinyl acetal) layer may exhibit a damping loss factor, or loss factor, of at least 0.10, at least 0.15, at least 0.17, at least 0.20, at least 0.25, at least 0.27, at least 0.30, at least 0.33, or at least 0.35. Loss factor is measured by Mechanical Impedance Measurement as described in ISO Standard 16940. To measure the loss factor, polymer samples are laminated between two sheets of clear glass, each having a thickness of 2.3 mm, and are prepared to have a width of 25 mm and a length of 300 mm. The laminated samples are then excited at the center point using a vibration shaker, commercially available from Brüel and Kjær (Nærum, Netherlands) and an impedance head is used to measure the force required to excite the bar to vibrate and the velocity of the vibration. The resultant transfer function is recorded on a National Instrument data acquisition and analysis system and the loss factor at the first vibration mode is calculated using the half power method.

According to some embodiments, the poly(vinyl acetal) resin or poly(vinyl acetal) layer may exhibit desirable acoustic properties, as indicated by, for example, the reduction in the transmission of sound as it passes through (i.e., the sound transmission loss of) the interlayer. In some embodiments, acoustic interlayers may exhibit a sound transmission loss at the coincident frequency, measured according to ASTM E90 at 20° C., of at least 34, at least 34.5, at least 35, at least 35.5, at least 36, at least 36.5, or at least 37 dB. During such sound transmission tests, the interlayers are laminated between two sheets of 2.3 mm clear glass and the test is conducted at a reference frequency of 3,150 Hz.

Tie Layers

In various embodiments, one or more of the non-cellulose ester layers described herein can be a tie layer. As used herein, a "tie layer" refers to a layer or sheet in an interlayer that bonds at least two other layers together. The tie layer can comprise, consist essentially of, or consist of a thermoplastic resin selected from the group consisting of cellulose, EVA, TPU, ionomer, polyvinyl acetate, ethylene vinyl alcohol, and combinations thereof. If cellulose is used as a tie layer, it cannot be co-extruded, but can be incorporated in various other methods known in the art.

In embodiments where the non-cellulose ester layer comprises a tie layer, the layer can contain minute amounts of plasticizer. For example, the tie layer may comprise less than 10, less than 5, less than 2, or less than 1 phr of plasticizer. In certain embodiments, the tie layer does not contain any plasticizers.

The tie layers can be used in conjunction with the cellulose ester layers described herein to enhance the bonds between the cellulose ester layers and various other layers in the multilayer interlayers, especially poly(vinyl acetal) or PVB layers. Exemplary multilayer interlayer configurations containing the tie layers include PVB/tie layer/cellulose ester/tie layer/PVB (e.g., skin/core/core/core/skin). In such embodiments, the tie layers can be at least partially interposed and/or positioned between the poly(vinyl acetal) layers and the cellulose ester layers.

In various embodiments, the interlayer exhibits a compressive shear adhesion ("CSA") between the cellulose ester layer and the tie layer of at least 5, at least 6, at least 7, at least 8, at least 9, at least 10, at least 11, at least 12, at least 13, at least 14, or at least 15 and/or not more than 50, not more than 45, not more than 40, not more than 35, not more than 30, or not more than 25 MPa. Compressive shear adhesion measurements are made with an Alpha Technologies T-20 Tensometer equipped with a special 45° compressive shear sample holder or jig. The laminate is drilled into at least five 1.25 inch diameter discs and kept at room temperature for 24 hours before performing the CSA test. The disc is placed on lower half of the jig and the other half of the jig is placed on top of the disc. The cross-head travels at 3.2 mm/min downward causing a piece of the disc to slide relative to the other piece. The compressive shear strength of the disc is the shear stress required to cause the adhesion to fail.

Multilayer interlayers containing a tie layer and a cellulose ester layer can be produced using any method known in the art. For example, each layer may be formed separately using techniques known in the art and then laminated together. Alternatively, multilayer interlayers containing a tie layer and a cellulose ester layer may be produced via co-extrusion.

Adhesive Coatings

Figure 2:
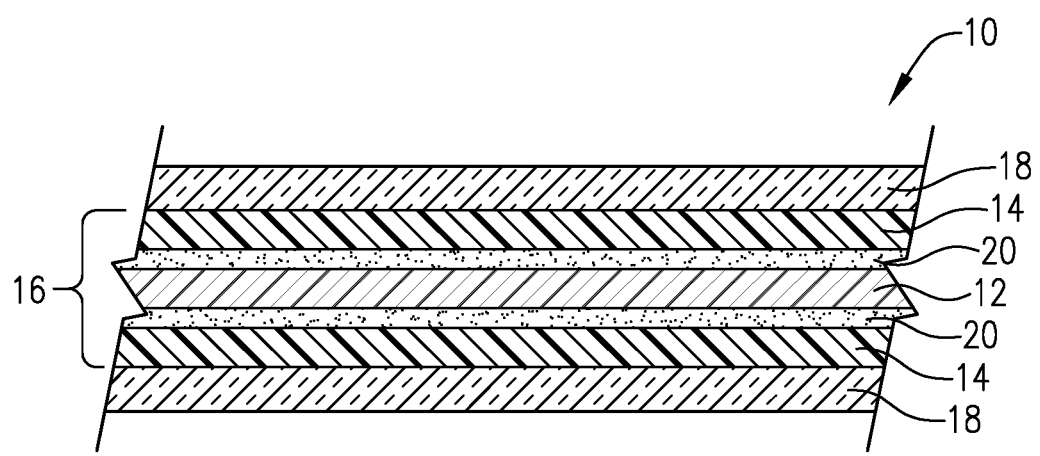
FIG. 2 depicts a structural glass laminate containing a multilayer interlayer of the present invention.

According to various embodiments of the present invention, the interlayers may include at least one adhesive coating comprising, consisting essentially of, or consisting of at least one adhesive agent. The adhesive agent can be any compound or material that facilitates adhesion between the surface of the cellulose ester layer and another layer in the multilayer interlayers. Rather than be incorporated into the cellulose ester layer, the adhesive agent according to embodiments of the present invention may be present on at least a portion of the surface of the cellulose ester layer prior to adhering the layer to another layer when forming the laminate or interlayer. FIG. 2 depicts an exemplary structural laminate 10 comprising a cellulose ester layer 12, two non-cellulose ester layers 14, and two adhesive coatings 20, which form the multilayer interlayer 16. As shown in FIG. 2, the interlayer 16 is interposed between two rigid substrates 18, such as glass.

In various embodiments, the adhesive agent can be selected from the group consisting of maleic anhydride, a silanol compound or a precursor thereof, a boron atom containing compound, such as a borate compound, a hydroxyl containing polymer such as ethylene vinyl alcohol (EVOH), polyamides, and the like, a low molecular weight cellulose ester, and combinations thereof. In one or more embodiments, the adhesive coating comprises at least 1, at least 2, at least 3, at least 4, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of the adhesive agent.

In various embodiments, the adhesive agent can comprise a silicone-containing compound such as a silane or silanol. Examples of suitable silicon-containing compounds can include organic alkoxysilanes including monoalkoxysilanes, dialkoxysilanes, and trialkoxysilanes. In some embodiments, the silicon-containing compound may be a trialkoxysilane such as, for example, a trimethoxysilane or a triethoxysilane. Examples of suitable trialkoxysilanes can include, but are not limited to, γ-glycidoxypropyltrimethoxysilane, aminopropyltriethyoxysilane, aminoethylaminopropyl-trimethoxysilane, and combinations thereof. When the silicon-containing compound comprises a silanol, it may comprise the hydrolyzed form of one or more of the silicon-containing compound listed above. In certain embodiments, the silicone-containing adhesive agent or precursor thereto comprises an alkoxysilane.

In various embodiments, the adhesive agent can comprise a maleic anhydride copolymer. In one or more embodiments, the maleic anhydride is selected from the group consisting of styrene maleic anhydride copolymers, maleic anhydride grafted polypropylene, copolymers of maleic anhydride with olefins and/or acrylic esters, and combinations thereof.

In some embodiments, the adhesive agent can be added to the surface of the cellulose ester layer by applying a coating material to at least a portion of the sheet surface. The coating material can include the adhesive agent, or a precursor thereto, and at least one carrier liquid. When an adhesive agent precursor is present in the coating material, at least a portion of the precursor can be converted to an adhesive agent upon application to the sheet. Alternatively, at least a portion of the precursor may be converted to the adhesive agent within the coating material, or the coating material may include the adhesive agent itself.

The coating material may further include at least one carrier liquid capable of dissolving or dispersing the adhesive agent, or precursor thereto, and for facilitating application of the adhesive agent or precursor to the surface of the polymer sheet. In some embodiments, the carrier liquid can comprise an aqueous carrier that can include, or be, water, while, in some embodiments, the carrier liquid can be an organic carrier that comprises one or more organic solvents, such as, for example, methanol. In some embodiments, the carrier liquid can comprise a mixture of water and one or more organic solvents, such as, for example, methanol. Depending on the type and amount of the adhesive agent present, the coating material can have a pH of at least 1, at least 1.5, at least 2, at least 2.5, at least 3, at least 3.5, at least 4, at least 4.5 and/or not more than 7, not more than 6.5, not more than 6, not more than 5.5, or not more than 5, or a pH in the range of from 1 to 7, 1.5 to 5.5, or 2 to 5. In some embodiments, the coating material can have a pH of at least 8, at least 8.5, at least 9, at least 9.5 and/or not more than 14, not more than 13, not more than 12, not more than 11, or in the range of from 8 to 14, 8.5 to 13, 9 to 12, or 9.5 toll.

The adhesive agent, or its precursor, may be present in the coating material in any concentration and, in some embodiments, may be present in an amount of at least 0.004, at least 0.005, at least 0.0075, at least 0.010, at least 0.025, at least 0.050, at least 0.10, at least 0.25, at least 0.75, at least 1, at least 1.25, at least 1.5, at least 2, at least 2.5, at least 5 and/or not more than 25, not more than 20, not more than 15, not more than 12, not more than 10, not more than 7.5, not more than 5, not more than 2.5, not more than 2, or not more than 1.5 weight percent, based on the total weight of the coating material, or an amount in the range of from 0.004 to 25, 0.0075 to 20, 0.010 to 15, or 0.25 to 7.5 weight percent, based on the total weight of the coating material.

The coating material can be applied to at least one surface of the cellulose ester sheet according to any suitable method. In some embodiments, at least a portion of the sheet may be dip coated, such that all or a portion of the sheet is submerged in the coating material. In other embodiments, the coating material may be applied to at least a portion of the cellulose ester layer surface by spray coating. Other suitable coating methods, including, for example, gravure coating or inkjet printing, may also be used. When the sheet is dip coated, the dip time can be at least 0.5 seconds, at least 30 seconds, at least 1, at least 2, at least 5, at least 10, at least 30, at least 60 minutes and/or not more than 90, not more than 60, not more than 30, not more than 15 minutes, or not more than 10 minutes, or in the range of from 0.5 seconds to 90 minutes, 30 seconds to 30 minutes, or 1 minute to 10 minutes.

In some embodiments, the amount of adhesive agent present at the surface of the cellulose ester layer can be characterized using X-ray photoelectron spectroscopy (XPS). The XPS method used to obtain numeric values for the amount of adhesive agent described herein is performed using an AXIS Nova spectrometer (commercially available from Kratos Analytics Ltd, Manchester, UK) with CasaXPS software version 2.3.17. The quantification is based on a wide scan survey spectra and was reported in relative atomic mole percent. Unless otherwise specified, all survey spectra obtained during the analysis are collected with an Al Kα monochromatic source operating at 150 W (15 kV, 10 mA) with a pass energy of 80 eV. The acceptance angle was +/−15° in spectroscopy mode, with a take-off angle of 90° and an analysis area of 700×300 μm. The charge neutralization was on and the charge correction was C 1s 284.8 eV. The narrow scan (high resolution) spectra were collected for elements of interest, including carbon, oxygen, and silicon, for peak fitting to elucidate oxidation states/chemical environments. These narrow spectra were collected using the same parameters described above for the wide scan with the exception of pass energy. Unless otherwise specified, the narrow scan spectra were collected using 20 eV pass energy.

According to some embodiments, the amount of silicon, or other adhesive agent or marker thereof, present at the surface of the cellulose ester layer may be at least 0.10, at least 0.30, at least 0.50, at least 0.75 and/or not more than 15, not more than 10, not more than 5, not more than 3, not more than 1.5, not more than 1.25 atomic percent, measured by the XPS method described above. The amount of silicon, or other adhesive agent or marker thereof, present at the surface of the cellulose ester layer can be in the range of from 0.10 to 15, 0.3 to 3, 0.50 to 1.5 atomic percent (at %), measured as described above.

The surface-treated locations of the cellulose ester layer can be present on substantially all, or a portion, of the surface of the cellulose ester layer. In some embodiments, only a portion of the surface of the cellulose ester layer can be treated, such that, for example, at least 5, at least 10, at least 15, at least 20, at least 30, or at least 40 percent of the surface of the layer remains untreated, while, in other embodiments, nearly all of the surface of the layer may be treated. In some embodiments, at least 5, at least 10, at least 15, at least 20, at least 30, at least 40, at least 50, at least 60, at least 70, at least 80, or at least 90 percent of the total surface area of the cellulose ester layer may be treated with the adhesive agent as described above.

As a result of the adhesive agent, the sheets and layers described herein may be capable of maintaining adhesion to other layers or substrates despite high levels of moisture ingress, even when the laminate is exposed to conditions of elevated temperature and humidity. For example, the layers and interlayers according to embodiments of the present invention may exhibit such a peel adhesion while having an average moisture content of at least 0.4, at least 0.5, at least 0.7, or at least 1 percent, measured by Karl-Fisher Titration according to ASTM E203.

In various embodiments, the interlayer exhibits a compressive shear adhesion between the cellulose ester layer and the adhesive coating of at least 5, at least 6, at least 7, at least 8, at least 9, at least 10, at least 11, at least 12, at least 13, at least 14, or at least 15 and/or not more than 50, not more than 45, not more than 40, not more than 35, not more than 30, or not more than 25 MPa, measured as previously described.

The adhesive coatings can be used in conjunction with the cellulose ester layers described herein to enhance the bonds between the cellulose ester layers and various other layers in the multilayer interlayers, especially poly(vinyl acetal) layers. In such embodiments, the adhesive coatings can be at least partially interposed and/or positioned between the poly(vinyl acetal) layers and the cellulose ester layers.

According to some embodiments of the present invention, the adhesive coating that includes at least one adhesive agent, or precursor thereto, can be applied to one or more surfaces of the cellulose ester layer or interlayer at one or more points during its production. Or, the coating material can be applied after production, as a post-production treatment step. In some embodiments, a method for making a polymer sheet is provided in which at least a portion of the sheet can be coated during its production. For example, after the sheet is extruded, or otherwise formed according to one or more methods listed above, the coating material may be applied to at least one surface via dip coating, spray coating, gravure coating, inkjet printing, or other coating methods. In some embodiments, at least a portion of the sheet may be passed through a bath of coating material while still on the production line. Once coated, the resin can be further cooled, cut, and removed from the line.

In some embodiments, a method for treating a cellulose ester layer is provided that comprises applying a coating material to a pre-formed cellulose ester sheet that has already been extruded, cooled, and optionally cut to form non-continuous polymer sheets. Such pre-formed sheets may be, in some embodiments, obtained from a third party manufacturer or another source and may be coated with at least one coating agent according to various embodiments described above. The pre-formed sheets may be coated and then stored, or may be coated and then laminated to at least one rigid substrate to form a multiple layer panel. The type and amount of the coating agent used may depend, at least in part, on the size of the sheet and its intended use.

Methods for Producing the Interlayers and Laminates

The interlayers according to various embodiments of the present invention can be made by any suitable process known to one of ordinary skill in the art of producing interlayers, and is not limited to a method for its manufacture. For example, it is contemplated that the layers or interlayers may be formed by extrusion or co-extrusion. In an extrusion process, one or more thermoplastic resins, plasticizers, and, optionally, one or more additives as described previously, can be pre-mixed and fed into an extrusion device. The extrusion device is configured to impart a particular profile shape to the thermoplastic composition in order to create an extruded sheet. The extruded sheet, which is at an elevated temperature and highly viscous throughout, can then be cooled to form a polymeric sheet. Once the sheet has been cooled and set, it may be cut and rolled for subsequent storage, transportation, and/or use as an interlayer.

Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

The extrusion process can occur at temperatures of at least 120, at least 130, at least 135, at least 140, at least 145, at least 150, at least 155, at least 160, at least 165, at least 170, at least 175, at least 180, at least 185, at least 190, at least 195, or at least 200° C. and/or not more than 280, not more than 270, not more than 260, not more than 250, or not more than 240° C., although other temperatures may be applicable depending on the materials and application.

The layers and interlayers described herein may be produced according to any suitable method. The resulting resin composition may be formed into a sheet or layer according to any suitable method including, but not limited to, solution casting, compression molding, injection molding, melt extrusion, melt blowing, and combinations thereof. When the interlayers are multilayer interlayers including two or more layers or sheets, such multilayer interlayers can also be produced according to any suitable method, including, for example, co-extrusion, blown film, melt blowing, dip coating, solution coating, blade, paddle, air-knife, printing, powder coating, spray coating, and combinations thereof.

Alternatively, each layer of the interlayer can be separately formed or extruded into sheets, and the sheet can be laid up to form a laminate structure of the desired order, and then pressed under heat and pressure to form the multilayer interlayer. In various embodiments of the present invention, the layers or interlayers may be formed by extrusion or co-extrusion. In an extrusion process, one or more thermoplastic polymers, plasticizers, and, optionally, at least one additive, can be pre-mixed and fed into an extrusion device, wherein the layer or interlayer can be melted and extruded from a die to thereby provide an extruded sheet.

Anti-blocking agents may also be added to the composition of the present invention to reduce the level of blocking of the interlayer. Desirably, they are added to the skin layers in the interlayer. Anti-blocking agents are known in the art, and any anti-blocking agent that does not adversely affect the properties of the interlayer may be used. A particularly preferred anti-blocking agent that can be successfully used as in the multilayer interlayer while not affecting optical properties of the interlayer or the adhesive properties of the interlayer to glass is a fatty acid amide (see U.S. Pat. No. 6,825,255, the entire disclosure of which is incorporated herein).

Other additives may be incorporated into any one of the above-described layers used to form the laminates or interlayers in order to enhance the performance of the final product and impart certain additional properties to the interlayer. Such additives include, but are not limited to, ACAs, dyes, pigments, stabilizers (e.g., ultraviolet stabilizers), antioxidants, flame retardants, IR absorbers or blockers (e.g., indium tin oxide, antimony tin oxide, lanthanum hexaboride (LaB$_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

The additives, in liquid, powder, or pellet form, are often used and can be mixed into the thermoplastic resin or plasticizer prior to arriving in the extruder device or combined with the thermoplastic resin inside the extruder device. These additives are incorporated into the cellulose ester or non-cellulose ester (thermoplastic) composition, and by extension the resultant multilayer interlayer, to enhance certain properties of the interlayer and its performance in a multiple layer glass panel product.

Interlayer Properties and End Uses

The cellulose ester interlayers can be used in many applications, such as in laminates or panels comprising one or more rigid substrates. A panel made with the cellulose ester interlayers described herein, such as a glass panel which comprises an interlayer laminated between two glass substrates, can have good optical clarity. The clarity of the interlayer laminated between glass substrates can be determined by measuring the haze value, which is a quantification of light not transmitted through the sheet glass panel containing the multilayer interlayer. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments, the interlayers described herein can exhibit a haze of less than 10, less than 9, less than 8, less than 7, less than 6, less than 5, less than 4, less than 3, less than 2, less than 1.5, less than 1, less than 0.75, or less than 0.5 percent as measured according to ASTM D1003-61.

Another parameter used to determine the optical performance is transparency, or percent visual transmittance (% T$_{vis}$), which is measured using a hazemeter, such as a Model D25 Hazemeter commercially available from Hunter Associates (Reston, Va.), in an Illuminant D65 at an observer angle of 10°. The values provided herein were obtained by analyzing a polymer sample which had been laminated between two sheets of clear glass, each having a thickness of 2.3 mm (commercially available from Pittsburgh Glass Works of Pennsylvania). In some embodiments, the resin compositions, layers, and interlayers of the present invention can have a percent visual transmittance of at least 50, at least 70, at least 80, at least 81, at least 82, at least 83, at least 84, at least 85, at least 85.5, at least 86, at least 86.5, at least 87, at least 87.5, at least 88, or at least 90 percent or more.

Yellowness Index ("YI") is another measure of optical quality. Yellowness Index of a polymer sheet is measured by laminating (and autoclaving) a 30 gauge (30 mil or 0.76 mm) sheet sample between two pieces of 2.3 mm clear glass using the HunterLab UltraScan XE according to ASTM Method E313 (formerly D-1925) (illuminant C, 2° observer angle) from spectrophotometric light transmittance in the visible spectrum. In various embodiments, the interlayers can exhibit a yellowness index of less than 1.5, less than 1.0, less than 0.75, less than 0.5, less than 0.4, or less than 0.3 according to ASTM E313.

The rigidity of the interlayers may also be characterized according to its three-point bending stiffness. The three-point bending stiffness, as described herein, is measured for an interlayer having a known thickness (such as 30 mils) when the interlayer is laminated between two sheets of 2.3 mm thick clear glass, according to ASTM D790 at room temperature. In some embodiments, a 30 mil interlayer can have a three-point bending stiffness of at least 150, at least 155, at least 160, at least 170, at least 180, at least 190, at least 200, at least 210, at least 220, at least 230, at least 240, at least 250, at least 260, at least 270, at least 280, at least 290, or at least 300 N/mm and/or not more than 350, not more than 340, not more than 330, not more than 320, or not more than 310 N/mm.

In addition to enhanced rigidity, interlayers according to embodiments of the present invention can exhibit desirable impact resistance, as characterized by the mean break height of the interlayer, when having a thickness of between 30 mils and 60 mils and when laminated between two sheets of 2.3 mm thick clear glass, measured according to ANSI/SAE Z26.1-1996 at a temperature of 70° C. In some embodiments, the interlayers as described herein can have a mean break height, measured as described above, of at least 10, at least 15, at least 20, at least 25, at least 30, at least 35, or at least 40 feet or more. In embodiments, the higher the mean break height, the better.

The values for mean break height provided herein are obtained using an interlayer having a thickness of 30 mils or 60 mils laminated between two 2.3-mm thick sheets of glass. The specification of values for these parameters is not intended to, in any way, limit the thickness of the interlayers described herein or the configuration of multiple layer panels according to embodiments of the present invention. Rather, specification of values for these parameters is intended to provide a definite test for determining the impact resistance, measured as mean break height, exhibited by an interlayer.

In some embodiments, the layers or interlayers can comprise flat layers having substantially the same thickness along the length of the sheet. In other embodiments, one or more layers of the interlayers can be wedge-shaped or can have a wedge-shaped profile, such that the thickness of the interlayer changes along the length of the sheet and one edge of the layer or interlayer has a thickness greater than the other. When the interlayer is a multilayer interlayer, at least one, at least two, or at least three of the layers of the interlayer can be wedge-shaped.

Figure 3:
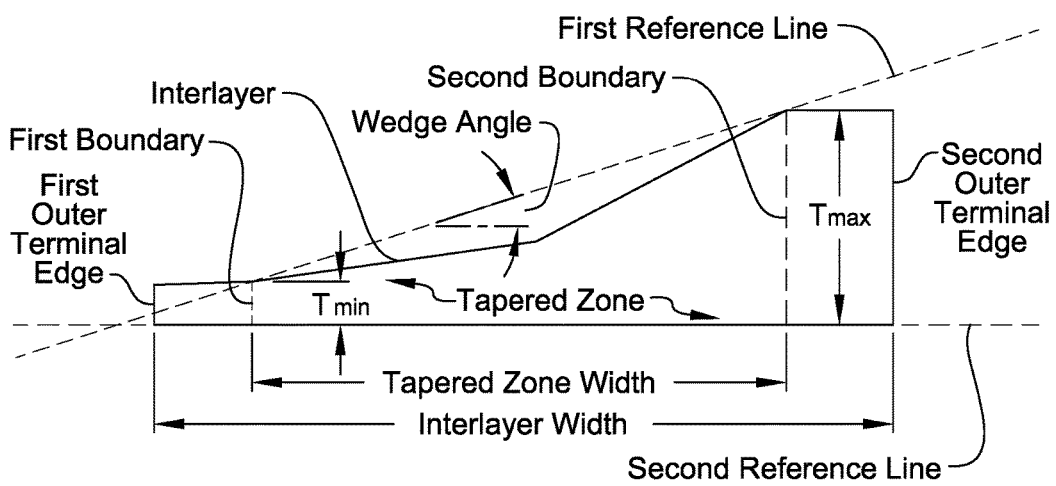
FIG. 3 is a cross-sectional view of a tapered interlayer configured in accordance with one embodiment of the present invention, where various features of the tapered interlayer are labeled for ease of reference.
Figure 4:
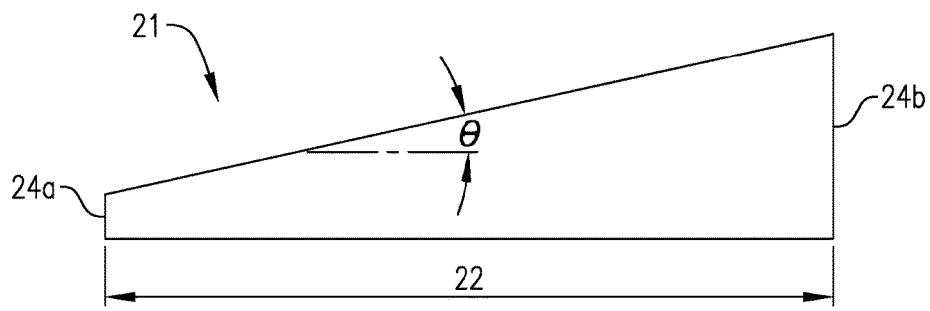
FIG. 4 is a cross-sectional view of a tapered interlayer having a tapered zone that extends over the entire width of the interlayer, where the entire tapered zone has a constant wedge angle and a linear thickness profile.
Figure 5:
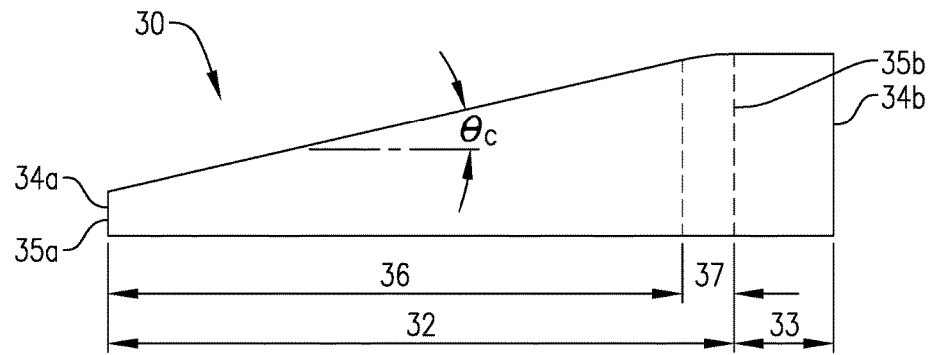
FIG. 5 is a cross-sectional view of a tapered interlayer having a tapered zone that extends over part of the width of the interlayer and a flat edge zone that extends over part of the width of the interlayer, where the tapered zone includes a constant angle zone and a variable angle zone.
Figure 6:
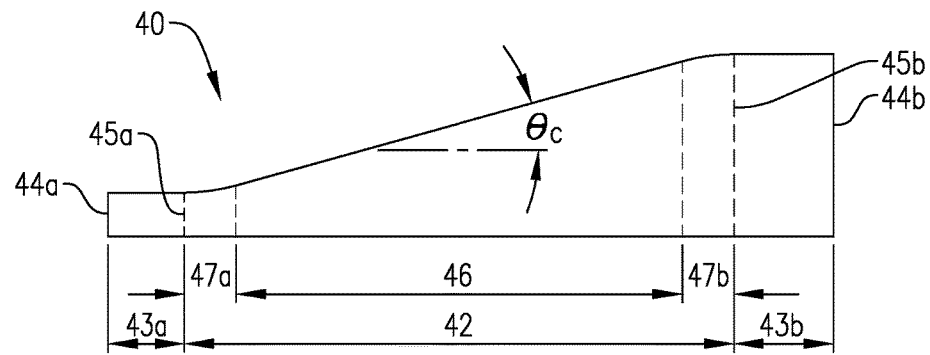
FIG. 6 is a cross-sectional view of a tapered interlayer having a tapered zone that extends over part of the width of the interlayer and two flat edge zones that extend over part of the width of the interlayer, where the tapered zone includes a constant angle zone and two variable angle zones.
Figure 7:
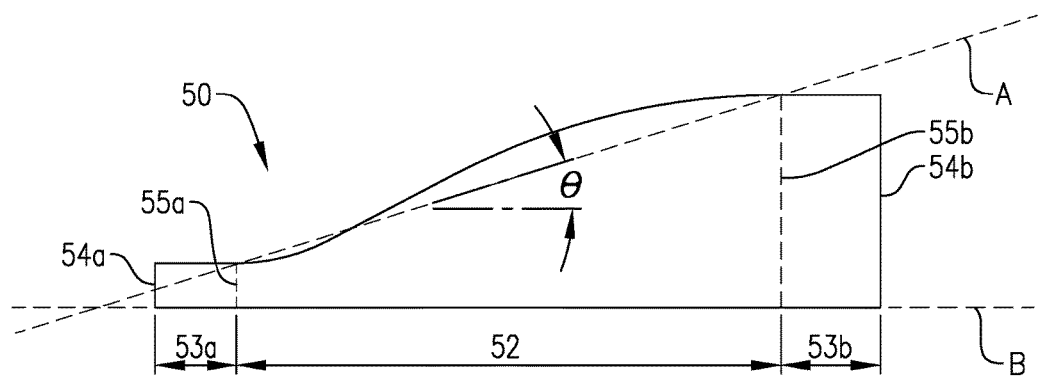
FIG. 7 is a cross-sectional view of a tapered interlayer having a tapered zone that extends over part of the width of the interlayer and two flat edge zones that extend over part of the width of the interlayer, where the tapered zone is formed entirely of variable angle zones having a curved thickness profile.
Figure 8:
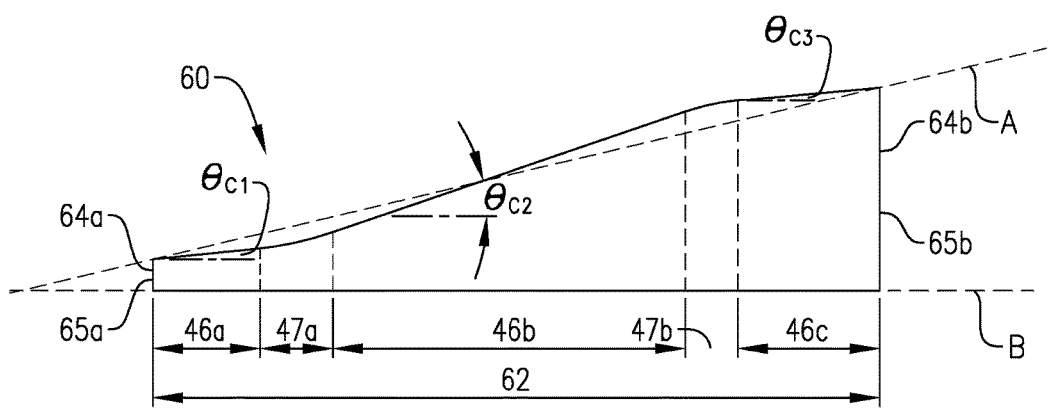
FIG. 8 is a cross-sectional view of a tapered interlayer having a tapered zone that extends over the entire width of the interlayer, where the tapered includes three constant angle zones spaced from one another by two variable angle zones.
Figure 9:
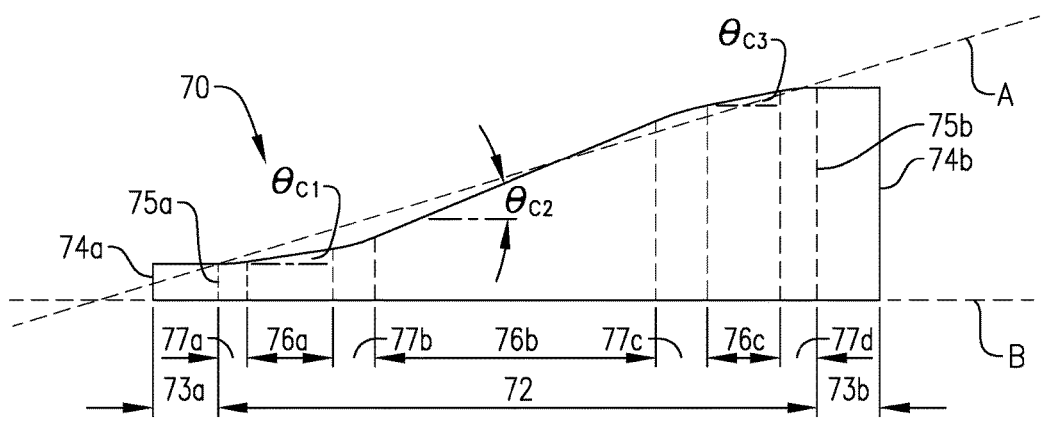
FIG. 9 is a cross-sectional view of a tapered interlayer having a tapered zone that extends over part of the width of the interlayer and two flat edge zones that extend over part of the width of the interlayer, where the tapered zone includes three constant angle zones and four variable angle zones.

Turning to FIGS. 3 through 9, several embodiments of tapered interlayers are provided. FIG. 3 is a cross-sectional view of an exemplary tapered interlayer that includes a tapered zone of varying thickness. As shown in FIG. 3, the tapered zone has a minimum thickness (T$_{min}$) measured at a first boundary of the tapered zone and a maximum thickness (T$_{max}$) measured at a second boundary of the tapered zone. In certain embodiments, T$_{min}$ can be at least 0.25, at least 0.40, or at least 0.60 millimeters (mm) and/or not more than 1.2, not more than 1.1, or not more than 1.0 mm. In certain embodiments, the difference between T$_{max}$ and T$_{min}$ can be at least 0.13, at least 0.15, at least 0.20, at least 0.25, at least 0.30, at least 0.35, at least 0.40 mm and/or not more than 1.2, not more than 0.90, not more than 0.85, not more than 0.80, not more than 0.75, not more than 0.70, not more than 0.65, or not more than 0.60 mm. In certain embodiments, the distance between the first and second boundaries of the tapered zone (i.e. the "tapered zone width") can be at least 5, at least 10, at least 15, at least 20, or at least 30 centimeters (cm) and/or not more than 200, not more than 150, not more than 125, not more than 100 or not more than 75 cm. Further, the tapered zone width can be in the range of 5 to 200 cm, 15 to 125 cm, or 30 to 75 cm.

As shown in FIG. 3, the tapered interlayer includes opposite first and second outer terminal edges. In certain embodiments, the distance between the first and second outer terminal edges (i.e., the "interlayer width") can be at least 20, at least 40, or at least 60 cm and/or not more than 400, not more than 200, or not more than 100 cm. In the embodiment depicted in FIG. 3, the first and second boundaries of the tapered zone are spaced inwardly from the first and second outer terminal edges of the interlayer. In such embodiments, only a portion of the interlayer is tapered. In an alternative embodiment, discussed below, the entire interlayer is tapered. When the entire interlayer is tapered, the tapered zone width is equal to the interlayer width and the first and second boundaries of the tapered zone are located at the first and second terminal edges, respectively.

As illustrated in FIG. 3, the tapered zone of the interlayer has a wedge angle ($\theta$), which is defined as the angle formed between a first reference line extending through two points of the interlayer where the first and second tapered zone boundaries intersect a first (upper) surface of the interlayer and a second reference line extending through two points where the first and second tapered zone boundaries intersect a second (lower) surface of the interlayer. In certain embodiments, the wedge angle of the tapered zone can be at least 0.10, at least 0.13, at least 0.15, at least 0.20, at least 0.25, at least 0.30, at least 0.35, or at least 0.40 milliradians (mrad) and/or not more than 1.2, not more than 1.0, not more than 0.90, not more than 0.85, not more than 0.80, not more than 0.75, not more than 0.70, not more than 0.65, or not more than 0.60 mrad.

When the first and second surfaces of the tapered zone are each planar, the wedge angle of the tapered zone is simply the angle between the first (upper) and second (lower) surfaces. However, as discussed in further detail below, in certain embodiments, the tapered zone can include at least one variable angle zone having a curved thickness profile and a continuously varying wedge angle. Further, in certain embodiments, the tapered zone can include two or more constant angle zones, where the constant angle zones each have a linear thickness profile, but at least two of the constant angle zones have different wedge angles. FIGS. 4 to 9 illustrate various tapered interlayers configured according to embodiments of the present invention.

As discussed above, the tapered interlayer can include one or more constant angle tapered zones, each having a width that is less than the overall width of the entire tapered zone. Each tapered zone can have a wedge angle that is the same as or different from the overall wedge angle of the entire tapered zone. For example, the tapered zone can include one, two, three, four, five or more constant angle tapered zones. When multiple constant angle tapered zones are employed, the constant angle tapered zones can be separated from one another by variable angle tapered zones that serve to transition between adjacent constant angle tapered zones.

The resin compositions, layers, and interlayers according to embodiments of the present invention may be utilized in a multiple layer panel or laminate that comprises at least one rigid substrate. Any suitable rigid substrate may be used and in some embodiments may be selected from the group consisting of glass, polycarbonate, biaxially oriented PET, copolyesters, acrylic, and combinations thereof. When the rigid substrate includes a polymeric material, the polymeric material may or may not include a hard coat surface layer. In some embodiments, the multilayer panels or laminates include a pair of rigid substrates with the resin interlayer disposed therebetween. In other embodiments, the multiple layer panels include a rigid substrate and a cellulose ester interlayer with a non-cellulose ester layer between them, optionally including a tie layer, adhesive coating and/or adhesion promoter as needed.

In various embodiments, the interlayers of the present invention will most commonly be utilized in multiple layer panels comprising two substrates, typically a pair of glass substrates, with the interlayers disposed between the two substrates. An example of such a construct would be: glass/interlayer/glass, wherein the interlayer can comprise any of the interlayers described above. These examples of multiple layer panels are in no way meant to be limiting, as one of ordinary skill in the art would readily recognize that numerous constructs other than those described above could be made with the interlayers of the present invention.

The interlayers described herein can be laminated between glass using techniques known in the art. The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 50° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135 and 150° C. and pressures between 150 psig and 200 psig for about 30 to 90 minutes. Other means for use in de-airing of the interlayer-glass interfaces (steps 2 to 5) known in the art and that are commercially practiced include vacuum bag and vacuum ring processes in which a vacuum is utilized to remove the air. An alternate lamination process involves the use of a vacuum laminator that first de-airs the assembly and subsequently finishes the laminate at a sufficiently high temperature and vacuum.

In various embodiments, the interlayers of the present invention can be used in structural applications that require maintaining good modulus at higher temperatures, such as outdoor applications that undergo regular intermittent stresses, caused by such factors as walking or running, or that are load bearing under temperature conditions that exceed 35° C. Examples of applications include stairs, outdoor platforms, pavement or sidewalk platforms, single side balcony laminates, canopies, support beams, stairs, handrails, building envelopes, bullet proof glass, and bomb blast resistant glass.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims. This invention can be further illustrated by the following examples of embodiments thereof, although it will be understood that these examples are included merely for the purposes of illustration and are not intended to limit the scope of the invention unless otherwise specifically indicated.

EXAMPLES

Example 1

Multilayer interlayers were produced with a cellulose acetate propionate ("CAP") layer interposed between two ethylene vinyl acetate ("EVA") layers to determine the structural capabilities of such interlayers. Sheets of photovoltaic grade formulated EVA from multiple suppliers were cut to 12 inch by 12 inch size. In addition, sheets of extruded CAP-482-20 Tenite Propionate 380A4000015 (CAP) (from Eastman Chemical Company) having about 16 wt. % (19 phr) 3GEH plasticizer were also cut to 12 inch by 12 inch size. The EVA and CAP sheets were conditioned in the cabinet at 85° F. and 24% RH for 18 to 24 hours before laying up. Glass sheets of 2.3 mm thickness were also cut to 12 inch by 12 inch size and washed. The sheets were then used to make glass laminates with a trilayer A/B/C interlayer structure having EVA sheets in the A and C positions and the CAP sheet in the B position. The laminate was then placed in the lower chamber of a vacuum laminator and was heated at 145° C. from the bottom of the vacuum laminator (which consisted of two chambers, an upper chamber and a lower chamber separated by a flexible rubber sheet). During the de-air cycle (5 minutes) a vacuum was pulled in both the upper and lower chambers such that the laminate was held under vacuum (100 to 120 Pa) without pressure. This was followed by the press cycle (25 minutes) where the air was vented from the upper chamber allowing the atmospheric pressure to enter the upper chamber forcing the rubber sheet to press onto the laminate at 1 atmosphere pressure. Table 1 shows the configuration of the laminates.

TABLE 1

| Samples | "A" Sheet | "B" Sheet | "C" Sheet |
|---|---|---|---|
| 1 | EVA (5 mil) | CAP (30 mil) | EVA |
| 2 | EVA (10 mil) | CAP (30 mil) | EVA |
| 3 | EVA (20 mil) | CAP (30 mil) | EVA |

Figure 10:
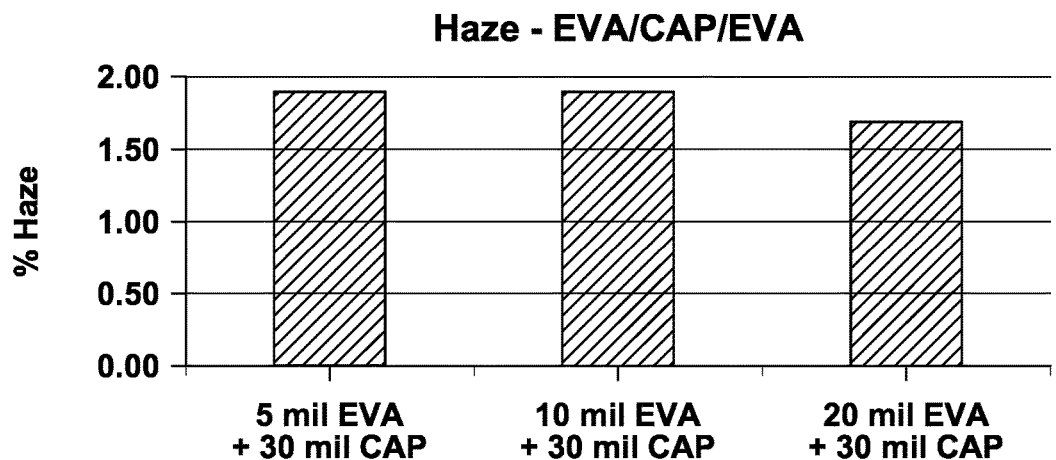
FIG. 10 is a graph depicting the haze measurements of the EVA/CAP/EVA interlayers produced in Example 1.
Figure 11:
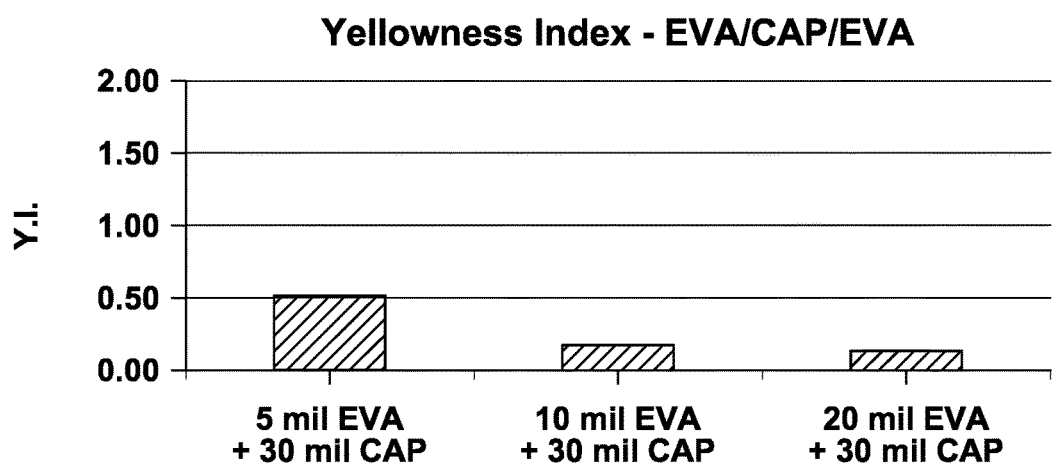
FIG. 11 is a graph depicting the yellowness index measurements of the EVA/CAP/EVA interlayers produced in Example 1.
Figure 12:
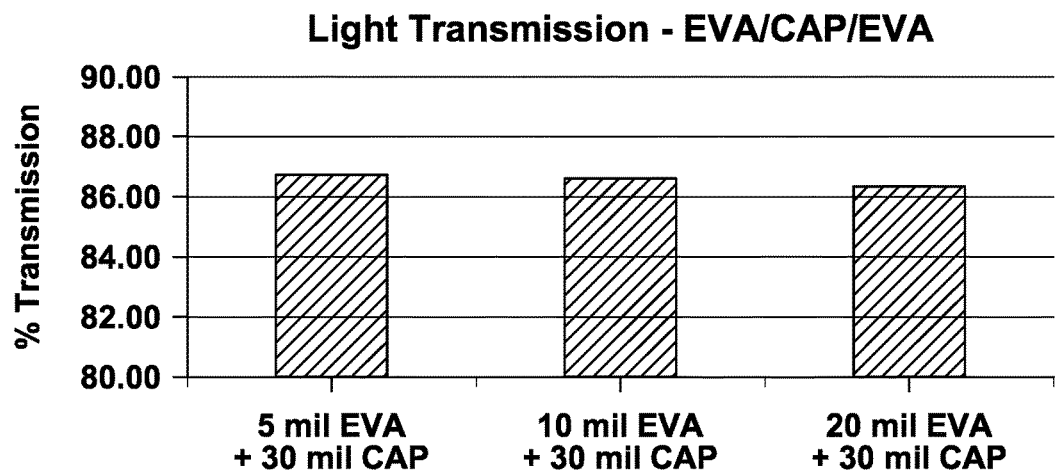
FIG. 12 is a graph depicting the light transmission measurements of the EVA/CAP/EVA interlayers produced in Example 1.

The optical properties (i.e., haze, yellowness index, and light transmission) were measured for the produced interlayers in accordance with the tests described herein to determine the effect that the thickness of the EVA layers had on the interlayers. In the first optical tests, EVA/CAP/EVA interlayers were tested having a CAP core layer with a thickness of 30 mil, while the EVA layers had varying thicknesses of 5 mil, 10 mil, and 20 mil each. FIGS. 10 to 12 depict the haze, yellowness index, and light transmission measurements for the tested interlayers. As shown in FIGS. 10 to 12, the produced interlayers all exhibited desirable optical properties and the thickness of the EVA layers had little effect on the optical properties of the interlayers.

Figure 13:
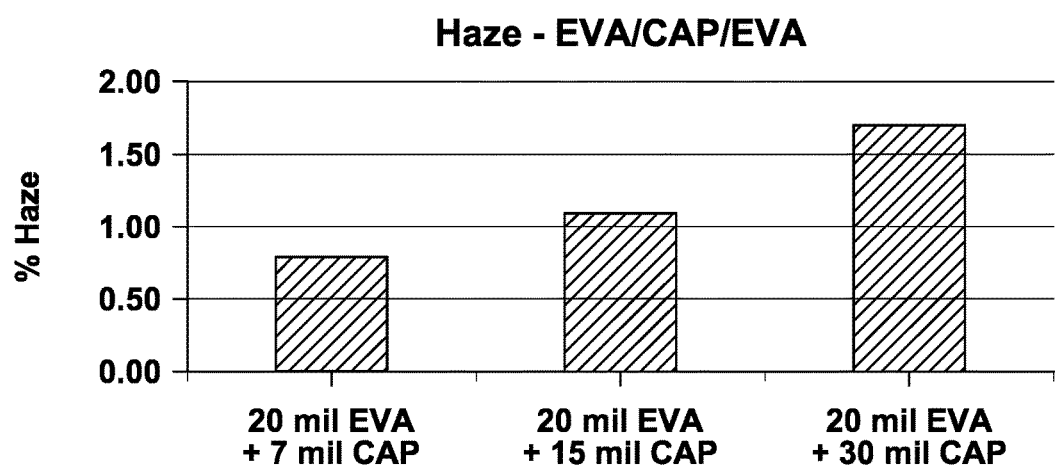
FIG. 13 is a graph depicting the haze measurements of the EVA/CAP/EVA interlayers produced in Example 1.
Figure 14:
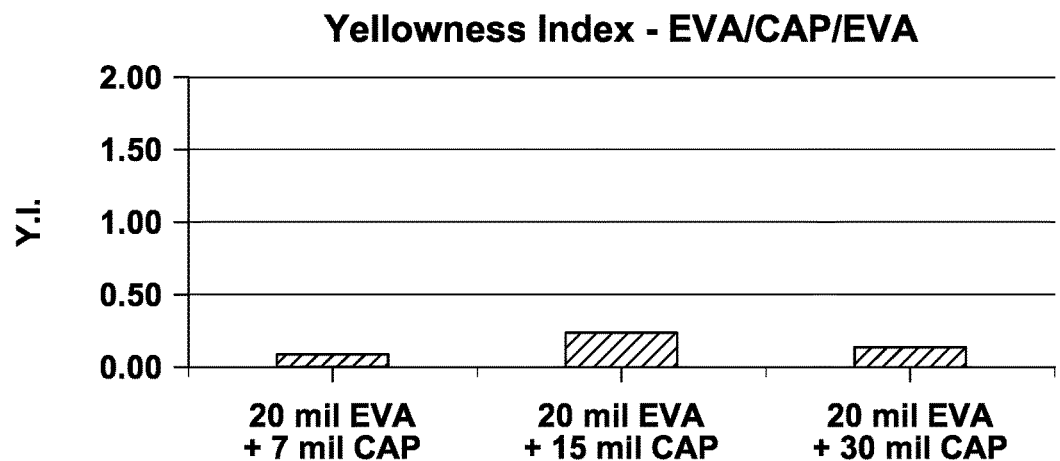
FIG. 14 is a graph depicting the yellowness index measurements of the EVA/CAP/EVA interlayers produced in Example 1.
Figure 15:
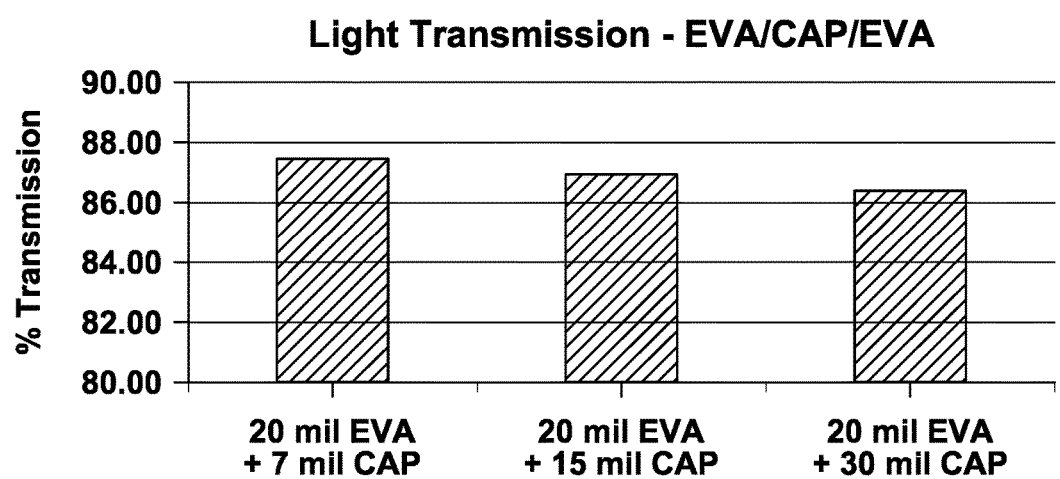
FIG. 15 is a graph depicting the light transmission measurements of the EVA/CAP/EVA interlayers produced in Example 1.

Additionally, the optical properties (i.e., haze, yellowness index, and light transmission) were measured for the produced interlayers in accordance with the tests described herein to determine the effect that the thickness of the CAP layers had on the interlayers. Table 2 shows the configuration of the laminates. In the second optical tests, EVA/CAP/EVA interlayers were tested having EVA skin layers with a thickness of 20 mil, while the CAP core layers had varying thicknesses of 7 mil, 15 mil, and 30 mil. FIGS. 13 to 15 depict the haze, yellowness index, and light transmission measurements for the tested interlayers. As shown in FIGS. 13 to 15, the produced interlayers all exhibited desirable optical properties and the thickness of the CAP layers had little effect on the optical properties of the interlayers.

TABLE 2

| Samples | "A" Sheet | "B" Sheet | "C" Sheet |
|---|---|---|---|
| 1 | EVA (20 mil) | CAP (30 mil) | EVA |
| 2 | EVA (20 mil) | CAP (15 mil) | EVA |
| 3 | EVA (20 mil) | CAP (7 mil) | EVA |

Figure 16:
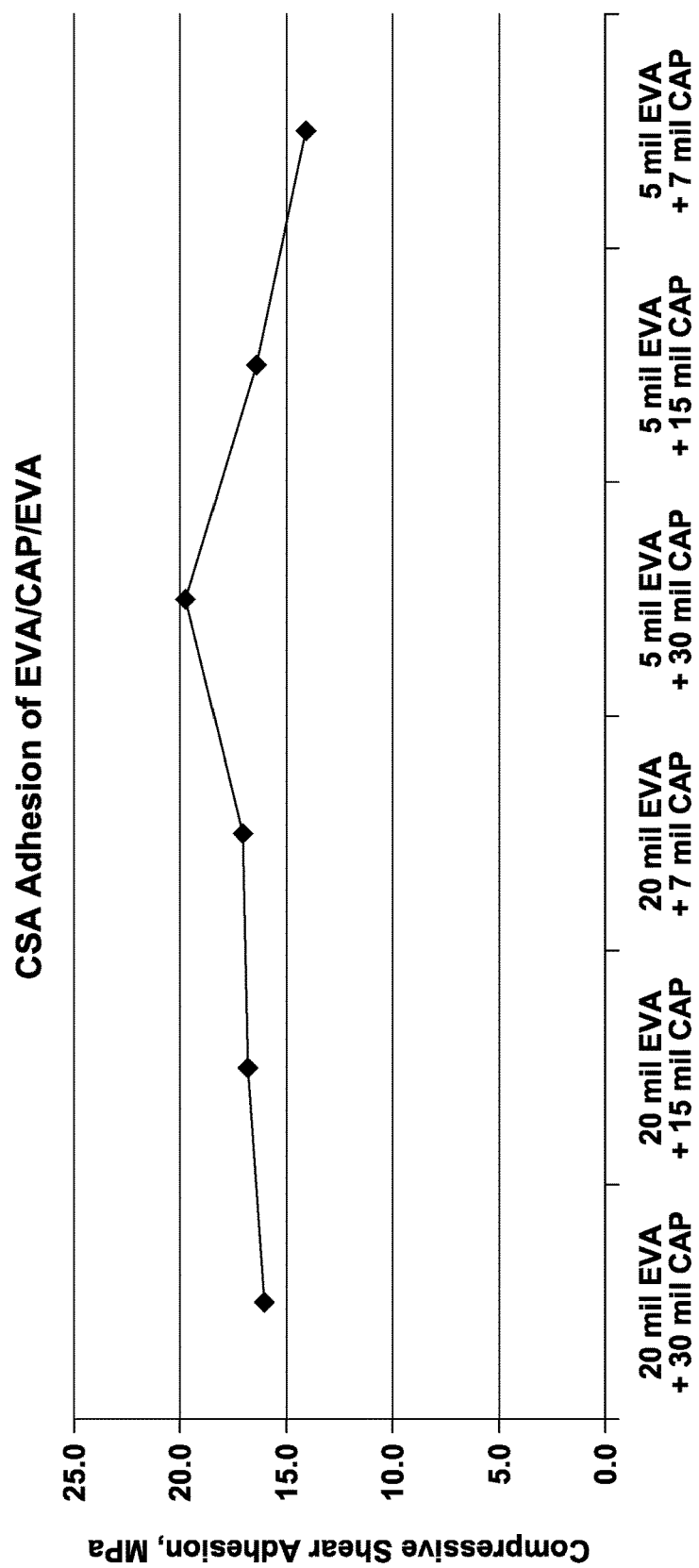
FIG. 16 is a graph depicting the compressive shear adhesion measurements of the EVA/CAP/EVA interlayers produced in Example 1.

Furthermore, the compressive shear adhesion was measured between the EVA and CAP layers. FIG. 16 depicts the results of these measurements and the thicknesses of the tested EVA and CAP layers. As shown in FIG. 16, the interlayers exhibited excellent adhesion between the EVA and CAP layers.

Figure 17:
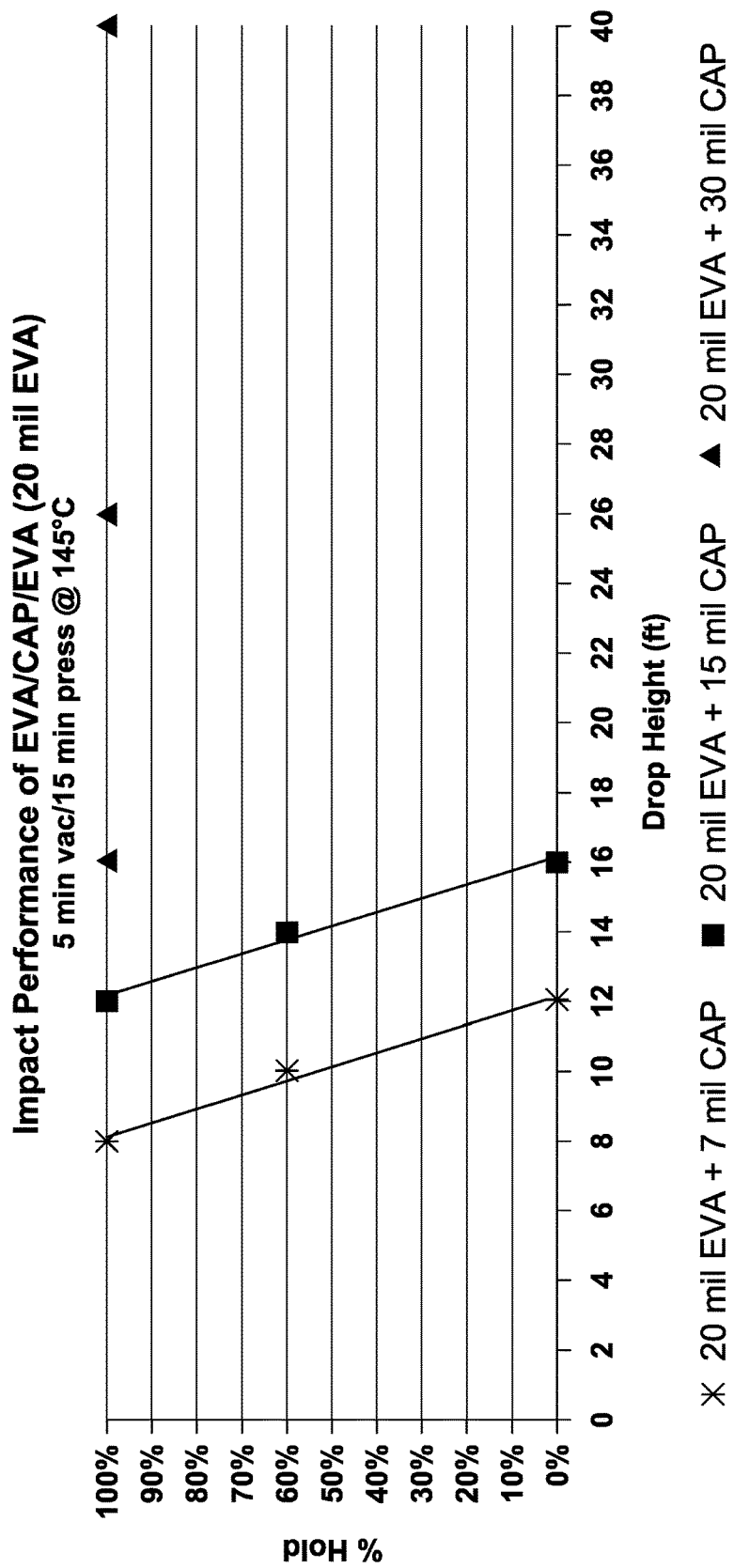
FIG. 17 is a graph depicting the mean break height of the EVA/CAP/EVA interlayers produced in Example 1.

In addition, the EVA/CAP/EVA interlayers were tested using the mean break height test according to ANSI/SAE Z26.1-1996, which is described above. The results of this test are depicted in FIG. 17, which also provides the thickness of the tested EVA and CAP layers. As shown in FIG. 17, the tested interlayers exhibited excellent impact performance, especially with CAP layers having a thickness of 30 mil.

Figure 18:
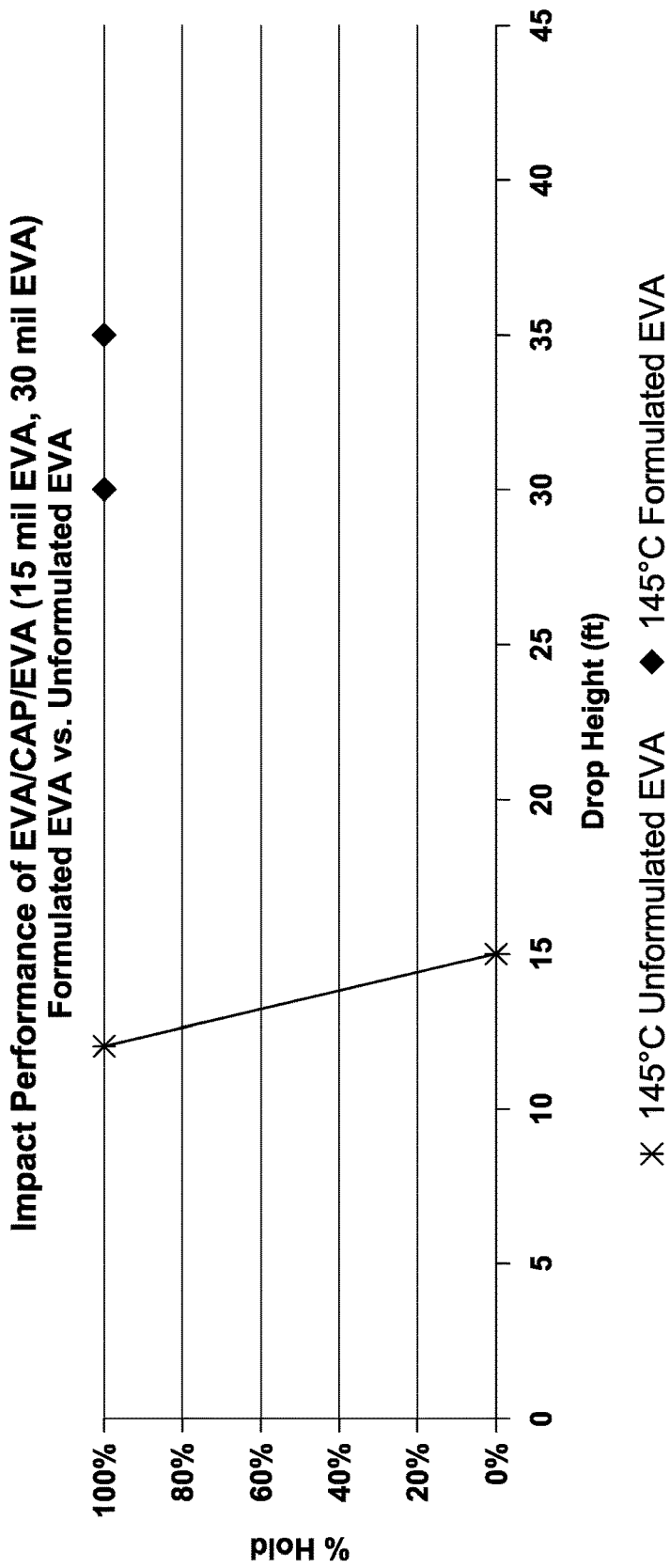
FIG. 18 is a graph comparing the mean break height of interlayers comprising formulated EVA and unformulated EVA.

Moreover, the impact performance of unformulated EVA was compared to the above described commercial formulated EVA in the interlayers. As shown in FIG. 18, interlayers produced with unformulated EVA did not perform as well as interlayers produced with formulated EVA when subjected to the mean break height test according ANSI/SAE Z26.1-1996.

Accordingly, the EVA/CAP/EVA films produced herein demonstrated very high stiffness and, thus, can serve as an advanced structural interlayer. Furthermore, it is expected that other cellulose esters will demonstrate similar visual and mechanical properties and would also be excellent candidates for structural interlayers.

Example 2

It was additionally demonstrated that EVA can be used as a tie layer to increase the adhesion between a polyvinyl butyral ("PVB") layer and a cellulose acetate propionate ("CAP") layer while retaining the impact performance and rigidity of the composite interlayer. Generally, there is limited adhesion between PVB and CAP and one way to solve the problem is to use a tie layer. A formulated EVA (VISTASOLAR®) layer was used to increase adhesion between a PVB layer and CAP layer.

Interlayer films having a PVB/EVA/CAP/EVA/PVB configuration were produced by laying separate films of each material via the hand lay-up method, which is well known in the art. This EVA used in the interlayers was produced in a pilot plant by Solutia Inc., a subsidiary of Eastman Chemical Company (Springfield, Mass.) and contained an EVA with a VA content of 28%, a silane additive, a peroxide additive, a co-activator, a UV blocker, and an antioxidant. The CAP was CAP-482-20 Tenite Propionate 380A4000015 used in the previous example (with 19 phr (16 wt. %) 3GEH plasticizer). The PVB was Saflex® RB11, a commercially available PVB interlayer that contains a plasticizer, a UV blocker, an antioxidant and adhesion control agents from Solutia Inc., a subsidiary of Eastman Chemical Company. The CAP layer had a thickness of 30 mil, the EVA layers each had a thickness of 5 mil, and the PVB layers each had a thickness of about 15 mil. The resulting interlayers were cut to 12 inches by 12 inches. The interlayers were laminated between two glass sheets of annealed glass each having thicknesses of 2.3 mm. The lamination process utilized a vacuum laminator, as described above, to laminate all samples, which involved: (1) placing the samples on the vacuum laminator lower chamber; (2) applying a vacuum for 5 minutes followed by 25 minutes in at 1 atmospheric pressure and 145° C.; and (3) cooling the laminates to room temperature. Ten samples were produced using this lamination technique. In addition, ten separate samples were produced using the above lamination process, except they were pressed at a temperature of 155° C.

Figure 19:
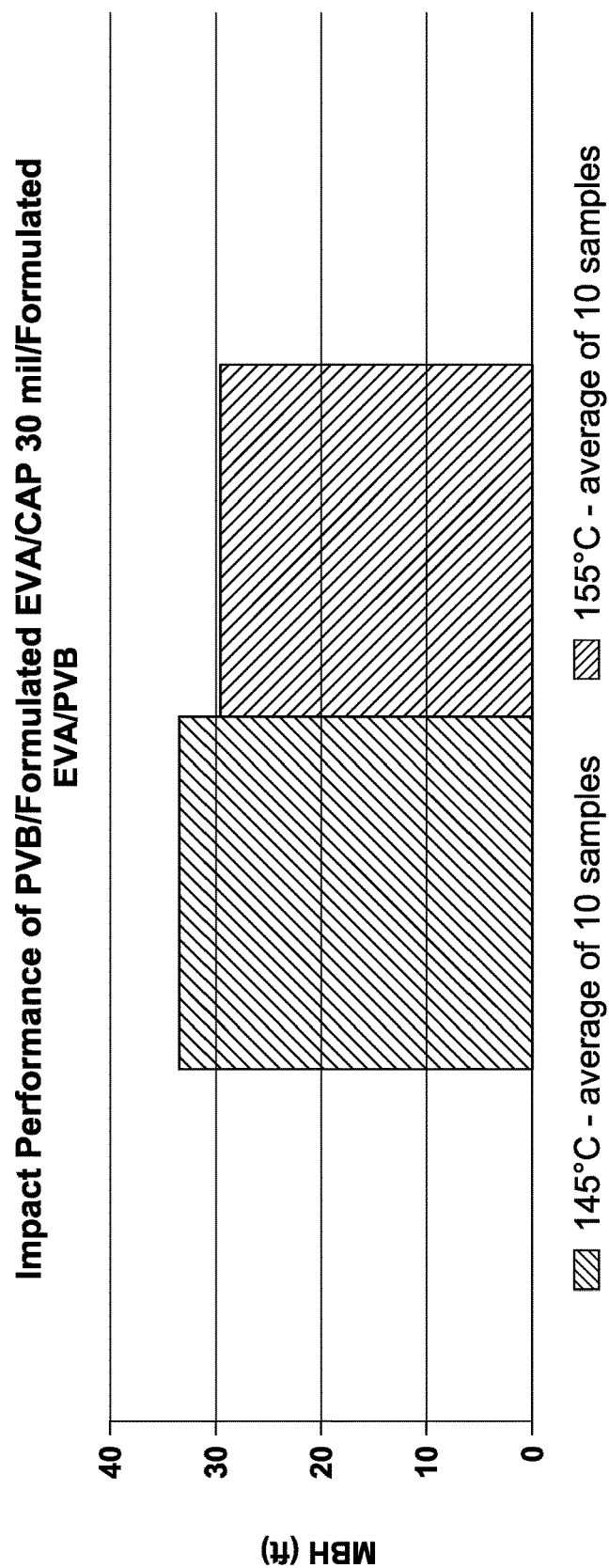
FIG. 19 is a graph comparing the mean break height of interlayers comprising formulated EVA and unformulated EVA.

The above samples were tested using the mean break height test according to ANSI/SAE Z26.1-1996, which is described above. The results of this test are depicted in FIG. 19. According to the tests, no delamination at any of the interlayer interfaces as a result of the impacts were observed, thereby indicating excellent interfacial adhesion. In addition, the average impact performance of the interlayers was very good.

It was also observed that EVA layers bind very well to both PVB and CAP layers, thus helping to increase the adhesion between these layers. In addition, the presence of the EVA layers did not negatively affect the optical and structural properties of the interlayers.

Example 3

Multilayer interlayers laminated between glass were produced with a cellulose acetate propionate layer (CAP) interposed between two thermoplastic polyurethane ("TPU") layers to determine the structural capabilities of such interlayers.

Interlayers having a TPU/CAP/TPU configuration were assembled. The TPU used in this study was A4700NAT (from Deerfield Urethane). The CAP was CAP-482-20 Tenite Propionate 380A4000015 used in the previous examples (with 19 phr (16 wt. %) 3GEH plasticizer). The CAP layer had a thickness of 30 mil, while the TPU layers each had a thickness of 15 mil. The resulting interlayers were cut to 12 inches by 12 inches. A total of ten interlayer samples were produced.

The ten interlayer samples were laminated between two annealed glass sheets having thicknesses of 2.3 mm and a dimension of 12 inches by 12 inches. The lamination process utilized a vacuum laminator, as described above, to laminate all samples, which involved: (1) placing the samples on the vacuum laminator lower chamber; (2) applying a vacuum for 5 minutes followed by 25 minutes in at 1 atmospheric pressure and 145° C.; and (3) cooling the laminates to room temperature. Ten samples were produced using this lamination technique.

The above samples were tested using the mean break height test according to ANSI/SAE Z26.1-1996. The average Mean Break Height was about 25 feet, which indicated good impact performance. In addition, the compressive shear adhesion was measured between the TPU and CAP layers to determine adhesion strength. Measurements were taken on five samples at the edge of the laminates and three samples at the center of the laminates by cutting 3 cm discs from these locations. These results of the measurements are depicted in Table 3, below.

TABLE 3

| Position | MPa on 3 cm Disc | | | | | Average |
|---|---|---|---|---|---|---|
| Sample | 1 | 2 | 3 | 4 | 5 | MPa |
| Edge | 12.90 | 9.20 | 9.12 | 6.54 | 12.19 | 10.4 |
| Center | 11.88 | 10.19 | 11.18 | N/A | N/A | |

As shown above, the adhesion testing showed that the interlayers had an average compressive shear adhesion strength of 10.4 MPa. Thus, this demonstrated that there was desirable adhesion between the TPU and CAP layers.

Furthermore, the haze and optical properties of three different samples were tested according to the test procedures described herein. Measurements were taken on the three samples at the edge of the laminates and the center of the laminates by cutting 3 cm discs from these locations. The optical measurements were conducted using an UltraScan Pro 1024 from Hunter Lab.

TABLE 4

| Sample | YI D1925 | % Haze |
|---|---|---|
| Edge 1 | −0.43 | 1.0 |
| Edge 2 | −0.45 | 1.1 |
| Edge 3 | −0.49 | 0.9 |
| Average | −0.457 | 1.0 |
| Center 1 | −0.45 | 1.0 |
| Center 2 | −0.46 | 1.1 |
| Center 3 | −0.48 | 1.1 |
| Average | −0.463 | 1.1 |

Based on the haze tests, the interlayers exhibited a low haze percentage of 1.1% or less. Accordingly, these interlayers exhibited good rigidity, good impact performance, and allowed desirable clarity when laminated into a glass panel.

Example 4

This study was undertaken to demonstrate that a thermoplastic polyurethane ("TPU") tie layer can be used to increase the adhesion between a polyvinyl butyral ("PVB") layer and a cellulose acetate propionate ("CAP") layer while retaining the impact performance and rigidity of the composite interlayer.

For this study, interlayer films having a PVB/TPU/CAP/TPU/PVB configuration were produced by laying separate films of each material via the hand lay-up method using the same TPU (15 mil), CAP (30 mil) and PVB (15 mil) as in the above Examples (using the same materials previously described). The resulting interlayers were cut to 12 inches by 12 inches. The interlayers were laminated between two annealed glass sheets each having thicknesses of 2.3 mm. The lamination process utilized a vacuum laminator to laminate all samples, which involved: (1) placing the samples on a conveyer and covering them with Teflon by DuPont; (2) applying a vacuum for 5 minutes followed by 25 minutes in a press at 145° C.; and (3) cooling the laminates to room temperature. Ten samples were produced using this lamination technique. In addition, ten separate samples were produced using the above lamination process, except they were pressed at a temperature of 155° C. Five samples that were laminated at 145° C. and ten samples that were laminated at 155° C. were tested using the mean break height test according to ANSI/SAE Z26.1-1996.

Limited delamination in only some of the tested interlayer interfaces as a result of the impacts was observed, thereby indicating good interfacial adhesion. In addition, the average impact performance was over 36 feet for samples produced at both temperatures and was considered desirable. The TPU layers bind very well to both PVB and CAP layers, thus helping to increase the adhesion between these layers.

Example 5

A study was conducted to determine if a silane compound applied on the surface of the CAP layer (produced using the same CAP and plasticizer as in the above examples) could increase adhesion to PVB. A solution was prepared by adding 25 wt. % of silane (Xiameter OFS-6020 (N-(3-(trimethoxysilyl)propyl) ethylenediamine)) into methanol. The surfaces of the CAP sheets were then spray coated using the silane solution by adding the solution into the cup of an airbrush in the desired amount (1 ml in this Example) and applying it to the surface of the CAP sheets, and the spray coated sheets were hung to air dry. Interlayer films having a PVB/CAP/PVB configuration were then produced by laying separate films of each material together via the hand lay-up method, which is well known in the art. The PVB was Saflex® DG41, a commercially available PVB interlayer that contains a plasticizer, a UV blocker, an antioxidant and adhesion control agents from Solutia Inc., a subsidiary of Eastman Chemical Company. The CAP layer had a thickness of about 30 mil and the PVB layers each had a thickness of about 30 mil. The resulting interlayers were cut to 6 inches by 9 inches. The interlayers were laminated between two glass sheets of annealed glass each having thicknesses of 2.3 mm. The lamination process utilized a vacuum laminator, as described above, to laminate all samples, which involved: (1) placing the samples on the vacuum laminator lower chamber; (2) applying a vacuum for 5 minutes followed by 25 minutes in at 1 atmospheric pressure and 145° C.; and (3) cooling the laminates to room temperature. The compressive shear adhesion was measured between the PVB and CAP layers to determine adhesion strength. It was found that the compressive shear adhesion of the interlayers comprising the silane solution was 26.5 MPa. Thus, this demonstrates that the use of the silane compound as an adhesion promoter helped to provide desirable adhesion between the PVB and CAP layers.

Example 6

Blends of CAP-504-0.2 Tenite Propionate (CAP) (from Eastman Chemical Company) and PVB resin (from Solutia Inc., a subsidiary of Eastman Chemical Company) were extruded into sheets after a plasticizer (35 phr 3GEH plasticizer was added to the blend of resins), adhesion control salts and an antioxidant were added. The blends were made at two blend levels: 80% PVB:20% CAP and 70% PVB:30% CAP. The films were then cut to 6 inch by 6 inch size sheets. Glass sheets of 2.3 mm thickness were also cut to 6 inch by 6 inch size and washed. The sheets were then used to make glass laminates with a trilayer A/B/C interlayer structure having PVB (Saflex® RB41) sheets in the A and C positions and the CAP/PVB blend sheet in the B position. The laminate was then placed in the lower chamber of a vacuum laminator and was heated at 145° C. from the bottom of the vacuum laminator (which consisted of two chambers, an upper chamber and a lower chamber separated by a flexible rubber sheet). During the de-air cycle (5 minutes) a vacuum was pulled in both the upper and lower chambers such that the laminate was held under vacuum (100 to 120 Pa) without pressure. This was followed by the press cycle (25 minutes) where the air was vented from the upper chamber allowing the atmospheric pressure to enter the upper chamber forcing the rubber sheet to press onto the laminate at 1 atmosphere pressure. The haze of the laminates was then measured, and the blend having 30% CAP and 70% PVB exhibited a haze value of about 0.4% while the blend having 20% CAP and 80% PVB exhibited a haze value of about 0.2%, showing that blends of CAP and PVB can be made that exhibit desirable very low haze.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject. As used herein, the terms "having," "has," and "have" have the same open-ended meaning as "comprising," "comprises," and "comprise" provided above. As used herein, the terms "including," "include," and "included" have the same open-ended meaning as "comprising," "comprises," and "comprise" provided above.

As used herein, the term "about" refers to values within ten percent of the recited value. The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

What is claimed is:

1. A multilayer interlayer comprising:
   (a) a non-cellulose ester layer comprising an ionomer resin; and
   (b) a cellulose ester layer comprising at least one cellulose ester having a hydroxyl content of at least 0.5 weight percent based on the entire weight of the cellulose ester, wherein said cellulose ester layer has a glass transition ("Tg") temperature of at least 50° C. and not more than 250° C.; wherein said cellulose ester interlayer exhibits a yellowness index of less than 1.5.

2. The multilayer interlayer of claim 1, wherein said ionomer resin comprises a partially neutralized acid-ethylene copolymer.

3. The multilayer interlayer of claim 1, wherein the cellulose ester comprises at least two different acyl groups selected from acetate, propionate, butyrate, other acyl groups and combinations thereof.

4. The multilayer interlayer of claim 3, wherein the cellulose ester comprises at least two of acetate, propionate and butyrate groups and combinations thereof.

5. The multilayer interlayer of claim 1, wherein said cellulose ester layer comprises a plasticizer.

6. The multilayer interlayer of claim 1, wherein said plasticizer comprises at least one high refractive index plasticizer having a refractive index of at least 1.460.

7. The multilayer interlayer of claim 1, wherein said cellulose ester layer comprises a mixture of at least two plasticizers, wherein a first plasticizer comprises triethylene glycol di-(2-ethylhexanoate) and a second plasticizer comprises a high refractive index plasticizer having a refractive index of at least 1.460.

8. The multilayer interlayer of claim 1, further comprising a second non-cellulose ester layer comprising an ionomer resin, wherein said cellulose ester layer is at least partially interposed between said cellulose ester layer and said second cellulose ester layer.

9. The multilayer interlayer of claim 1, wherein said cellulose ester layer exhibits a shear storage modulus that is greater than the shear storage modulus of said non-cellulose ester layer.

10. A multilayer interlayer comprising:
    (a) a non-cellulose ester layer comprising an ionomer resin; and
    (b) a cellulose ester layer comprising at least one cellulose ester having a hydroxyl content of at least 0.5 weight percent based on the entire weight of the cellulose ester and a plasticizer, wherein said cellulose ester layer has a glass transition ("Tg") temperature of at least 70° C. and not more than 250° C.; wherein said cellulose ester interlayer exhibits a yellowness index of less than 1.5.

11. The multilayer interlayer of claim 10, wherein the cellulose ester comprises at least two different acyl groups selected from acetate, propionate, butyrate, other acyl groups and combinations thereof.

12. The multilayer interlayer of claim 11, wherein the cellulose ester comprises at least two of acetate, propionate and butyrate groups and combinations thereof.

13. The multilayer interlayer of claim 10, wherein said plasticizer comprises at least one high refractive index plasticizer having a refractive index of at least 1.460.

14. The multilayer interlayer of claim 10, wherein said ionomer resin comprises a partially neutralized acid-ethylene copolymer.

15. The multilayer interlayer of claim 10, further comprising a second non-cellulose ester layer comprising an ionomer resin, wherein said cellulose ester layer is at least partially interposed between said non-cellulose ester layer and said second non-cellulose ester layer.

16. A multilayer interlayer comprising:
    (a) a first non-cellulose ester layer comprising an ionomer resin; and
    (b) a cellulose ester layer comprising at least one cellulose ester having a hydroxyl content of at least 0.5 weight percent based on the entire weight of the cellulose ester and a plasticizer, wherein said cellulose ester layer has a glass transition ("Tg") temperature of at least 50° C. and not more than 250° C.; wherein said cellulose ester interlayer exhibits a yellowness index of less than 1.5;
    (c) a second non-cellulose ester layer comprising an ionomer resin, wherein said cellulose ester layer is disposed between and in contact with said first non-cellulose ester layer and said second non-cellulose ester layer.

17. The multilayer interlayer of claim 16, wherein the cellulose ester comprises at least two different acyl groups selected from acetate, propionate, butyrate, other acyl groups and combinations thereof.

18. The multilayer interlayer of claim 17, wherein the cellulose ester comprises at least two of acetate, propionate and butyrate groups and combinations thereof.

19. The multilayer interlayer of claim 17, wherein said plasticizer comprises at least one high refractive index plasticizer having a refractive index of at least 1.460.

20. A laminate comprising the interlayer of claim 17.

* * * * *